United States Patent
Kurakane

(10) Patent No.: US 11,069,941 B2
(45) Date of Patent: Jul. 20, 2021

(54) NONAQUEOUS ELECTROLYTE SECONDARY BATTERY

(71) Applicant: Sumitomo Chemical Company, Limited, Tokyo (JP)

(72) Inventor: Kosuke Kurakane, Osaka (JP)

(73) Assignee: SUMITOMO CHEMICAL COMPANY, LIMITED, Tokyo (JP)

(*) Notice: Subject to any disclaimer, the term of this patent is extended or adjusted under 35 U.S.C. 154(b) by 0 days.

(21) Appl. No.: 15/989,901

(22) Filed: May 25, 2018

(65) Prior Publication Data

US 2018/0342720 A1 Nov. 29, 2018

(30) Foreign Application Priority Data

May 29, 2017 (JP) .............................. JP2017-105925

(51) Int. Cl.
| | |
|---|---|
| *H01M 2/16* | (2006.01) |
| *H01M 4/131* | (2010.01) |
| *H01M 4/133* | (2010.01) |
| *H01M 4/505* | (2010.01) |
| *H01M 4/525* | (2010.01) |
| *H01M 4/587* | (2010.01) |
| *H01M 10/0525* | (2010.01) |
| *H01M 50/411* | (2021.01) |
| *H01M 50/417* | (2021.01) |
| *H01M 4/02* | (2006.01) |

(52) U.S. Cl.
CPC ......... *H01M 50/411* (2021.01); *H01M 4/131* (2013.01); *H01M 4/133* (2013.01); *H01M 4/505* (2013.01); *H01M 4/525* (2013.01); *H01M 4/587* (2013.01); *H01M 10/0525* (2013.01); *H01M 50/417* (2021.01); *H01M 2004/021* (2013.01)

(58) Field of Classification Search
CPC ...... H01M 4/131; H01M 4/133; H01M 4/505; H01M 4/525; H01M 4/587; H01M 10/052; H01M 10/0525; H01M 10/058; H01M 50/411; H01M 50/417; H01M 50/463; H01M 2004/021; H01M 2300/0025; Y02E 60/10
See application file for complete search history.

(56) References Cited

U.S. PATENT DOCUMENTS

| | | |
|---|---|---|
| 3,931,446 A | 1/1976 | Murayama et al. |
| 4,923,650 A | 5/1990 | Antoon, Jr. et al. |
| 5,008,296 A | 4/1991 | Antoon, Jr. et al. |
| 5,011,698 A | 4/1991 | Antoon, Jr. et al. |
| 5,051,183 A | 9/1991 | Takita et al. |
| 5,571,634 A | 11/1996 | Gozdz et al. |
| 6,395,419 B1 | 5/2002 | Kuwahara et al. |
| 6,949,315 B1* | 9/2005 | Samii ................. B01D 67/0009 429/142 |
| 7,208,555 B2 | 4/2007 | Tada et al. |
| 7,255,957 B2* | 8/2007 | Takahashi ............. H01M 4/136 429/94 |
| 8,931,647 B2 | 1/2015 | Shiki et al. |
| 9,508,975 B1 | 11/2016 | Matsuo |
| 9,876,210 B2 | 1/2018 | Ogata et al. |
| 10,074,840 B2 | 9/2018 | Honda et al. |
| 10,319,973 B2 | 6/2019 | Ogata et al. |
| 10,361,418 B2 | 7/2019 | Ogata et al. |
| 10,361,458 B2 | 7/2019 | Ogata et al. |
| 10,367,182 B2 | 7/2019 | Ogata et al. |
| 10,388,932 B2 | 8/2019 | Ogata et al. |
| 10,461,297 B2 | 10/2019 | Ogata et al. |
| 10,707,517 B2 | 7/2020 | Arise et al. |
| 2002/0018936 A1* | 2/2002 | Suzuki .................. H01M 2/164 429/247 |
| 2002/0136887 A1 | 9/2002 | Penneau et al. |
| 2003/0031924 A1 | 2/2003 | Lee et al. |
| 2003/0157314 A1 | 8/2003 | Penneau et al. |
| 2003/0175494 A1 | 9/2003 | Penneau et al. |

(Continued)

FOREIGN PATENT DOCUMENTS

| | | |
|---|---|---|
| CN | 1041167 A | 4/1990 |
| CN | 1362892 A | 8/2002 |

(Continued)

OTHER PUBLICATIONS

Office Action dated Jun. 19, 2018 in KR Application No. 1020180060097.

(Continued)

*Primary Examiner* — Anca Eoff
(74) *Attorney, Agent, or Firm* — Panitch Schwarze Belisario & Nadel LLP

(57) ABSTRACT

The present invention provides a nonaqueous electrolyte secondary battery having excellent battery characteristics, including a battery separator containing a polyolefin porous film; a positive electrode plate; and a negative electrode plate. The polyolefin porous film has a puncture strength of at least 26.0 gf/g/m² and satisfies Formula (A), and the positive and negative electrode plates satisfy Formula (B).

$$0.00 \leq |1 - T/M| \leq 0.54 \quad (A)$$

$$0.00 \leq |1 - T/M| \leq 0.50 \quad (B)$$

T represents a distance by which the polyolefin porous film or positive or negative electrode plate moves in a traverse direction from a starting point to a point where a critical load is obtained in a scratch test under a constant load of 0.1 N, and M represents a distance by which the porous film or positive or negative electrode plate moves in a machine direction from the starting point to the point where the critical load is obtained.

4 Claims, 2 Drawing Sheets

(56) References Cited

U.S. PATENT DOCUMENTS

| | | |
|---|---|---|
| 2006/0014912 A1 | 1/2006 | Araki et al. |
| 2007/0072069 A1 | 3/2007 | Yamada et al. |
| 2007/0092705 A1 | 4/2007 | Lee et al. |
| 2007/0190334 A1 | 8/2007 | Araki et al. |
| 2007/0232709 A1 | 10/2007 | Lee et al. |
| 2009/0101600 A1 | 4/2009 | Shiki et al. |
| 2009/0111025 A1 | 4/2009 | Lee et al. |
| 2009/0148659 A1 | 6/2009 | Ishiodori et al. |
| 2009/0148685 A1 | 6/2009 | Kang et al. |
| 2009/0200509 A1 | 8/2009 | Suzuki et al. |
| 2010/0009265 A1 | 1/2010 | Hatayama et al. |
| 2010/0123096 A1 | 5/2010 | Suzuki |
| 2010/0167125 A1 | 7/2010 | Miyaki et al. |
| 2010/0208177 A1 | 8/2010 | Kobayashi et al. |
| 2010/0285341 A1 | 11/2010 | Yun et al. |
| 2011/0027660 A1 | 2/2011 | Takeda et al. |
| 2011/0212358 A1 | 9/2011 | Usami et al. |
| 2011/0293989 A1 | 12/2011 | Hasegawa et al. |
| 2011/0305940 A1 | 12/2011 | Usami et al. |
| 2012/0028101 A1 | 2/2012 | Ishihara et al. |
| 2012/0028102 A1 | 2/2012 | Ishihara et al. |
| 2012/0028131 A1 | 2/2012 | Ishihara et al. |
| 2012/0034518 A1 | 2/2012 | Ishihara et al. |
| 2012/0034519 A1 | 2/2012 | Ishihara et al. |
| 2012/0035285 A1 | 2/2012 | Noumi et al. |
| 2012/0040232 A1 | 2/2012 | Ishihara et al. |
| 2012/0135305 A1 | 5/2012 | Kim et al. |
| 2012/0268072 A1 | 10/2012 | Okuno |
| 2012/0308898 A1 | 12/2012 | Sawamoto et al. |
| 2013/0071743 A1 | 3/2013 | Miyaki et al. |
| 2013/0089770 A1 | 4/2013 | Nishikawa |
| 2013/0089772 A1 | 4/2013 | Nishikawa |
| 2013/0095365 A1 | 4/2013 | Nishikawa |
| 2013/0164618 A1 | 6/2013 | Konishi |
| 2013/0196208 A1 | 8/2013 | Nemoto |
| 2013/0266831 A1 | 10/2013 | Motohashi et al. |
| 2013/0319599 A1 | 12/2013 | Huang |
| 2013/0337311 A1 | 12/2013 | Itou |
| 2014/0050965 A1 | 2/2014 | Ha et al. |
| 2014/0178741 A1 | 6/2014 | Hasegawa et al. |
| 2014/0272505 A1 | 9/2014 | Yoon et al. |
| 2014/0363726 A1 | 12/2014 | Honda et al. |
| 2014/0377630 A1 | 12/2014 | Kawakami et al. |
| 2015/0093647 A1 | 4/2015 | Kako et al. |
| 2015/0155541 A1 | 6/2015 | Hasegawa |
| 2015/0180002 A1 | 6/2015 | Nishikawa et al. |
| 2015/0188108 A1 | 7/2015 | Miyazawa et al. |
| 2015/0236323 A1 | 8/2015 | Honda et al. |
| 2015/0263325 A1 | 9/2015 | Honda et al. |
| 2015/0280194 A1 | 10/2015 | Mitsuoka et al. |
| 2015/0349312 A1 | 12/2015 | Ha et al. |
| 2015/0372276 A1 | 12/2015 | Mizuno et al. |
| 2016/0036027 A1 | 2/2016 | Nishikawa |
| 2016/0118639 A1 | 4/2016 | Ishihara |
| 2016/0181584 A1 | 6/2016 | Hatayama et al. |
| 2016/0181593 A1 | 6/2016 | Jin et al. |
| 2016/0268571 A1 | 9/2016 | Honda |
| 2017/0012265 A1 | 1/2017 | Nakadate et al. |
| 2017/0033347 A1 | 2/2017 | Murakami et al. |
| 2017/0033348 A1 | 2/2017 | Murakami et al. |
| 2017/0098809 A1 | 4/2017 | Ogata et al. |
| 2017/0141373 A1 | 5/2017 | Murakami et al. |
| 2017/0155113 A1 | 6/2017 | Hashiwaki et al. |
| 2017/0155114 A1 | 6/2017 | Kurakane |
| 2017/0155120 A1 | 6/2017 | Yoshimaru et al. |
| 2017/0155121 A1 | 6/2017 | Ogata |
| 2017/0162849 A1 | 6/2017 | Murakami et al. |
| 2017/0170443 A1 | 6/2017 | Murakami et al. |
| 2017/0263905 A1 | 9/2017 | Ogata et al. |
| 2017/0279102 A1 | 9/2017 | Hasegawa et al. |
| 2017/0341035 A1 | 11/2017 | Sato et al. |
| 2017/0365831 A1 | 12/2017 | Ogata et al. |
| 2017/0365832 A1 | 12/2017 | Ogata et al. |
| 2017/0365833 A1 | 12/2017 | Ogata et al. |
| 2017/0365834 A1 | 12/2017 | Ogata et al. |
| 2017/0365835 A1 | 12/2017 | Ogata et al. |
| 2017/0365836 A1 | 12/2017 | Ogata et al. |
| 2017/0365878 A1 | 12/2017 | Ogata et al. |
| 2018/0013118 A1 | 1/2018 | Kawakami et al. |
| 2018/0083249 A1 | 3/2018 | Hasegawa et al. |
| 2018/0261878 A1 | 9/2018 | Azami |
| 2018/0301740 A1 | 10/2018 | Min et al. |
| 2018/0342720 A1 | 11/2018 | Kurakane |
| 2019/0074539 A1 | 3/2019 | Shen et al. |
| 2019/0189993 A1 | 6/2019 | Arise et al. |
| 2019/0190037 A1 | 6/2019 | Mizuno et al. |
| 2019/0334149 A1 | 10/2019 | Li et al. |
| 2019/0386274 A1 | 12/2019 | Wood et al. |
| 2019/0393466 A1 | 12/2019 | Lin et al. |
| 2020/0052269 A1 | 2/2020 | Taguchi et al. |
| 2020/0070470 A1 | 3/2020 | Yoshimaru et al. |

FOREIGN PATENT DOCUMENTS

| | | |
|---|---|---|
| CN | 1825666 A | 8/2006 |
| CN | 1933923 A | 3/2007 |
| CN | 101500696 A | 8/2009 |
| CN | 101516975 A | 8/2009 |
| CN | 101836138 A | 9/2010 |
| CN | 101983219 A | 3/2011 |
| CN | 102307944 A | 1/2012 |
| CN | 102339965 A | 2/2012 |
| CN | 102372856 A | 3/2012 |
| CN | 102651466 A | 8/2012 |
| CN | 103155219 A | 6/2013 |
| CN | 103155220 A | 6/2013 |
| CN | 103474601 A | 12/2013 |
| CN | 103477491 A | 12/2013 |
| CN | 104051776 A | 9/2014 |
| CN | 104241574 A | 12/2014 |
| CN | 105322120 A | 2/2016 |
| EP | 0834941 A1 | 4/1998 |
| JP | S51017274 A | 2/1976 |
| JP | H06104736 A | 4/1994 |
| JP | H9161778 A | 6/1997 |
| JP | H11016561 A | 1/1999 |
| JP | H11040129 A | 2/1999 |
| JP | H1186844 A | 3/1999 |
| JP | H11120994 A | 4/1999 |
| JP | H11130900 A | 5/1999 |
| JP | H11300180 A | 11/1999 |
| JP | 2001118558 A | 4/2001 |
| JP | 2001351616 A | 12/2001 |
| JP | 2002265658 A | 9/2002 |
| JP | 2004087209 A | 3/2004 |
| JP | 2005135659 A | 7/2005 |
| JP | 2005179562 A | 7/2005 |
| JP | 2005200623 A | 7/2005 |
| JP | 2005222773 A | 8/2005 |
| JP | 2005343957 A | 12/2005 |
| JP | 2006066243 A | 3/2006 |
| JP | 2007048581 A | 2/2007 |
| JP | 2008062229 A | 3/2008 |
| JP | 2008123996 A | 5/2008 |
| JP | 4247027 B2 | 4/2009 |
| JP | 2009104967 A | 5/2009 |
| JP | 2009185093 A | 8/2009 |
| JP | 2009218198 A | 9/2009 |
| JP | 2009256404 A | 11/2009 |
| JP | 2009259605 A | 11/2009 |
| JP | 2010118312 A | 5/2010 |
| JP | 2010157361 A | 7/2010 |
| JP | 2010232088 A | 10/2010 |
| JP | 2010540744 A | 12/2010 |
| JP | 2011077014 A | 4/2011 |
| JP | 4773064 B2 | 9/2011 |
| JP | 201276255 A | 4/2012 |
| JP | 2012104422 A | 5/2012 |
| JP | 2012150972 A | 8/2012 |
| JP | 5085581 B2 | 11/2012 |
| JP | 2012227066 A | 11/2012 |
| JP | 2012256528 A | 12/2012 |
| JP | 5164296 B2 | 3/2013 |
| JP | 2013046998 A | 3/2013 |

(56) References Cited

FOREIGN PATENT DOCUMENTS

| | | | |
|---|---|---|---|
| JP | 213171629 A | 9/2013 |
| JP | 5302456 B1 | 10/2013 |
| JP | 2013218875 A | 10/2013 |
| JP | 2013234263 A | 11/2013 |
| JP | 5355823 B1 | 3/2014 |
| JP | 5432417 B2 | 3/2014 |
| JP | 2015111461 A | 6/2015 |
| JP | 2015120835 A | 7/2015 |
| JP | 2015122234 A | 7/2015 |
| JP | 5553165 B2 | 3/2016 |
| JP | 2016040354 A | 3/2016 |
| JP | 2016051695 A | 4/2016 |
| JP | 2016066755 A | 4/2016 |
| JP | 2016071969 A | 5/2016 |
| JP | 5932161 B1 | 6/2016 |
| JP | 5876616 B1 | 10/2016 |
| JP | 6012838 B1 | 10/2016 |
| JP | 6025957 B1 | 11/2016 |
| JP | 2017066356 A | 4/2017 |
| JP | 6153992 B2 | 6/2017 |
| JP | 2017103041 A | 6/2017 |
| JP | 2017103042 A | 6/2017 |
| JP | 2017103046 A | 6/2017 |
| JP | 2017103204 A | 6/2017 |
| JP | 2017103209 A | 6/2017 |
| JP | 2017107848 A | 6/2017 |
| JP | 217142917 A | 8/2017 |
| JP | 2017168419 A | 9/2017 |
| JP | 2017226117 A | 11/2017 |
| JP | 2014213500 A | 12/2017 |
| JP | 2017226120 A | 12/2017 |
| JP | 2017226121 A | 12/2017 |
| JP | 2017226122 A | 12/2017 |
| JP | 2017228404 A | 12/2017 |
| KR | 20060072065 A | 6/2006 |
| KR | 20060101541 A | 9/2006 |
| KR | 20060118668 A | 11/2006 |
| KR | 20090037552 A | 4/2009 |
| KR | 20120003864 A | 1/2012 |
| KR | 20120128612 A | 11/2012 |
| KR | 20130031319 a | 4/2013 |
| KR | 20130036043 A | 4/2013 |
| KR | 101430975 B1 | 8/2014 |
| KR | 20140112668 A | 9/2014 |
| KR | 20140113186 A | 9/2014 |
| KR | 20140114428 A | 9/2014 |
| KR | 101479749 B1 | 1/2015 |
| KR | 20150020667 A | 2/2015 |
| KR | 20150032555 A | 3/2015 |
| KR | 101510972 B1 | 4/2015 |
| KR | 20150083839 A | 7/2015 |
| KR | 20150119836 A | 10/2015 |
| KR | 20160002173 A | 1/2016 |
| KR | 20160014616 A | 2/2016 |
| KR | 20160016805 A | 2/2016 |
| KR | 20160038918 A | 4/2016 |
| KR | 20160094846 A | 8/2016 |
| KR | 101707380 | 2/2017 |
| KR | 20170031794 A | 3/2017 |
| TW | 201523980 A | 6/2015 |
| WO | 9859384 A1 | 12/1998 |
| WO | 2007119850 A1 | 10/2007 |
| WO | 2006018161 A1 | 2/2008 |
| WO | 2010089939 A1 | 8/2010 |
| WO | 2012090632 A1 | 7/2012 |
| WO | 2012137375 A1 | 10/2012 |
| WO | 2013073503 A1 | 5/2013 |
| WO | 2013099539 A1 | 7/2013 |
| WO | 2013133074 A1 | 9/2013 |
| WO | 2015099190 A1 | 7/2015 |
| WO | 2015141477 A1 | 9/2015 |
| WO | 2016104792 A1 | 6/2016 |
| WO | 2016152863 A1 | 9/2016 |

OTHER PUBLICATIONS

Office Action dated Dec. 30, 2019 in U.S. Appl. No. 16/223,737, by ARISE.
Office Action dated Dec. 31, 2018 in U.S. Appl. No. 15/627,736 by OGATA.
Office Action dated Aug. 18, 2017 in KR Application No. 1020170041604.
Solvay, "Solef PVDF, Design & Processing Guide," pp. 1-64 (2015).
Written Opinion dated Jan. 10, 2017 in International Application No. PCT/JP2016/081481.
International Search Report dated Jan. 10, 2017 in International Application No. PCT/JP2016/081481.
Martins et al. "Electroactive Phases of Poty(Vinylidene Flouride): Determination, Processing, and Applications," Progress in Polymer Science, vol. 39, pp. 683-706 (2014).
Mohammadi et al., "Effect of Tensile Strain Rate and Elongation on Crystalline Structure and Piezoelectric Properties of PVDF Thin Films" Polymer Testing, vol. 26, pp. 42-50 (2007).
Notice of Allowance dated Jan. 17, 2017 in KR .Application No. 1020160087266.
Notice of Allowance dated Mar. 29, 2018 in KR Application No. 1020170041590.
Notice of Allowance dated Mar. 29, 2018 in KR Application No. 1020170041621.
Office Action dated Mar. 12, 2019 in JP Appiioation No. 2017243278 (Partial English Translation).
Office Action dated Mar. 12, 2009 in JP Application No. 2017243282 (Partial English Translation).
Office Action dated Mar. 12, 2019 in JP Application No. 2017243286 (Partial English Translation).
Office Action dated Mar. 28, 2018 in CN Application No. 201610865635.7.
Office Action dated Apr. 3, 2018 in JP Application 2017243278 (Partial English Translation).
Office Action dated Apr. 3, 2018 in JP Application No. 2017243277 (Partial English Translation).
Office Action dated Apr. 3, 2018 in JP Application No. 2017243280 (Partial English Translation).
Office Action dated Apr. 3, 2018 in JP Application No. 2017243282.
Office Action dated Apr. 3, 2018 in JP Application No. 2017243284 (Partial English Translation).
Office Action dated Apr. 3, 2018 in JP Application No. 2017243286 (Partial English Translation).
Office Action dated Apr. 3, 2018 in JP Application No. 2017243289.
Office Action dated Apr. 3, 2018 in JP Application No. 2017243292 (PartialEnglish Translation)
Office Action dated Apr. 10, 2018 in JP Application No. 2017243293 (Partial English Translation).
Office Action issued Apr. 10, 2019 in U.S. Appl. No. 15/627,585, by Ogata.
Office Action dated Apr. 19, 2017 in KR Application No. 1020160077240.
Office Action dated May 16, 2017 in JP Application No. 2017033720 (Partial English Translation).
Office Action dated Jun. 10, 2020 in U.S. Appl. No. 16/223,737 by Arise.
Office Action dated Jun. 15, 2017 in U.S. Appl. No. 15/398,231, by Ogata.
Office Action dated Jun. 28, 2016 in JP Application No. 2016024163 (Partial English Translation).
Office Action dated Jul. 29, 2016 in in KR Application No. 102016077240.
Office Action dated Aug. 4, 2020 in U.S. Appl. No. 6/224,014, by Kashiwazaki.
Office Action dated Aug. 04, 2020 in U.S. Appl. No. 16/224,111 by Arise.
Office Action dated Aug. 06, 2020 in U.S. Appl. No 16/224,785 by Kurkane.
Office Action dated Aug. 18, 2017 iN KR Application No. 1020170041366.

(56) References Cited

OTHER PUBLICATIONS

Office Action dated Aug. 18, 2017 in KR Application No. 1020170041590.
Office Action dated Aug. 18, 2017 in KR Application No. 1020170041595.
Office Action dated Aug. 18, 2017 in KR Application No. 1020170041611.
Office Action dated Aug. 23, 2016 in JP Application No. 2016127005.
Office Action dated Aug. 29, 2019 in KR Application No. 1020197013298 (Partial English Translation).
Office Action dated Aug. 30, 2017 in CN Application No. 201611225799.X.
Office Action dated Sep. 20, 2018 in U.S. Appl. No. 15/627,629, by Ogata.
Office Action dated Sep/ 28, 2016 in KR Application No. 1020160087266.
Office Action dated Oct. 2, 2018 in JP Application 2017243278 (Partial English Transiation).
Office Action dated Oct. 2, 2018 in JP Application No. 2017243282.
Office Action dated Oct. 2, 2018 in JP Application No. 2017243286 (Partialndlish Translation).
Office Action dated Oct. 2, 2018 in JP Application No. 2017243289.
Office Action dated Oct. 22, 2018 in U.S. Appl. No. 15/627,556, by Ogata.
Office Action dated Oct. 22, 2018 in U.S. Appl. No. 15/627,664 by Ogata.
Office Action dated Oct. 22, 2018 in U.S. Appl. No. 15/627,671, by Ogata.
Office Action dated Oct. 24, 2018 in U.S. Appl. No. 15/627,804, by Ogata.
Office Action dated Nov. 29, 2016 in JP Application No. 2016024163 (Partial English Translation).
Office Action dated Dec. 6, 2016 in JP Application No. 2016127005.
Office Action dated Dec. 20, 2018 in U.S. Appl. No. 15/627,585, by Ogata.
Office Action dated Dec. 21, 2016 in KR Application No. 1020160077240.
Office Action dated Dec. 21, 2020 in CN Application No. 201710472456.1.
Office Action dated Dec. 22, 2020 in CN Application No. 201710472390.6.
Kawanishi, K., "Effect of Crystalline Forms of Polyvinylidene Fluoride (PVDF) on PVDF Resin Coated Steel Sheet Bendability," The Journal of the Surface Finishing Society of Japan, vol. 48, No. 8, pp. 811-814 (1997).
Obata, J., "Scratch Tester" Technical Sheet No. 13011, Japan, Technology Research Institute of Osaka Prefecture, pp. 1-2(2013).
Office Action dated Aug. 18, 2020 in JP Application No. 2019108158 (with Partial English Translation).
Office Action dated Sep. 23, 2020 in JP Application No. 2016123055 (Partial English Translation).
Office Action dated Jan. 21, 2021 in U.S. Appl. No. 16/224,777, by Kurakane.
Office Action dated Jan. 21, 2021 in U.S. Appl. No. 16/224,767, by Kurakane.
Office Action dated Feb. 2, 2021 in CN Application No. 201710467490.X.
Office Action dated Mar. 10, 2021 in CN Application No. 201710472303.7.

* cited by examiner

NONAQUEOUS ELECTROLYTE SECONDARY BATTERY

This Nonprovisional application claims priority under 35 U.S.C. § 119 on Patent Application No. 2017-105925 filed in Japan on May 29, 2017, the entire contents of which are hereby incorporated by reference.

TECHNICAL FIELD

The present invention relates to a nonaqueous electrolyte secondary battery and a member for a nonaqueous electrolyte secondary battery (hereinafter referred to as a "nonaqueous electrolyte secondary battery member").

BACKGROUND ART

Nonaqueous electrolyte secondary batteries, particularly lithium secondary batteries, have a high energy density and are thus in wide use as batteries for, for example, personal computers, mobile telephones, and portable information terminals. Such nonaqueous electrolyte secondary batteries have recently been developed as on-vehicle batteries.

As a nonaqueous electrolyte secondary battery such as a lithium-ion secondary battery, known is a nonaqueous electrolyte secondary battery that includes a porous film as disclosed in, for example, Patent Literature 1, which porous film contains polyolefin as a main component.

CITATION LIST

Patent Literature

[Patent Literature 1] Japanese Patent Application Publication, Tokukaihei, No. 11-130900 (1999)

SUMMARY OF INVENTION

Technical Problem

During charge/discharge of a nonaqueous electrolyte secondary battery, expansion and shrinkage of electrodes occur. Then, due to the expansion and shrinkage of the electrodes, there occur (i) a deformation, in a thicknesswise direction, of surface layers of a separator, which surface layers face the respective electrodes and (ii) a force which occurs in a horizontal direction and which occurs at an interface between the separator and an electrode. Therefore, according to the nonaqueous electrolyte secondary battery in which the conventional separator is incorporated, the deformation in the thicknesswise direction and the force in the horizontal direction may cause a decrease in plane direction-uniformity in distance between the electrodes. This may result in deterioration in battery characteristic of the nonaqueous electrolyte secondary battery.

Furthermore, the expansion and shrinkage of the electrodes during charge/discharge of a nonaqueous electrolyte secondary battery may cause a decrease in uniformity within an electrode mix. This may result in deterioration in battery characteristic of the conventional nonaqueous electrolyte secondary battery.

Solution to Problem

The inventors of the present invention found that it is possible to obtain a nonaqueous electrolyte secondary battery having excellent battery characteristics by adjusting (a) a porous film containing a polyolefin-based resin as a main component (hereinafter referred to as "polyolefin porous film"), (b) a positive electrode plate, and (c) a negative electrode plate, which are contained in the nonaqueous electrolyte secondary battery, such that their respective ratio of a traverse direction-critical load distance (T) measured in a scratch test to a machine direction-critical load distance (M) measured in a scratch test fall within certain ranges. On the basis of this finding, the inventors completed the present invention.

The present invention encompasses a nonaqueous electrolyte secondary battery and a nonaqueous electrolyte secondary battery member both of which are described below.

[1] A nonaqueous electrolyte secondary battery including: a positive electrode plate; a nonaqueous electrolyte secondary battery separator containing a polyolefin porous film; and a negative electrode plate, wherein the polyolefin porous film has a puncture strength of equal to or greater than 26.0 $gf/g/m^2$, which puncture strength is measured with respect to a weight per unit area of the polyolefin porous film, and wherein the polyolefin porous film has a value in a range of 0.00 to 0.54, the positive electrode plate has a value in a range of 0.00 to 0.50, and the negative electrode plate has a value in a range of 0.00 to 0.50, where each of the values is represented by the following Formula (1):

$$|1-T/M| \qquad (1)$$

where T represents a distance by which the polyolefin porous film, the positive electrode plate, or the negative electrode plate moves in a traverse direction from a starting point of measurement to a point where a critical load is obtained in a scratch test under a constant load of 0.1 N, and M represents a distance by which the polyolefin porous film, the positive electrode plate, or the negative electrode plate moves in a machine direction from a starting point of measurement to a point where a critical load is obtained in a scratch test under a constant load of 0.1 N.

[2] The nonaqueous electrolyte secondary battery as described in [1], wherein the positive electrode plate contains a transition metal oxide.

[3] The nonaqueous electrolyte secondary battery as described in [1], wherein the negative electrode plate contains graphite.

[4] A nonaqueous electrolyte secondary battery member including: a positive electrode plate; a nonaqueous electrolyte secondary battery separator containing a polyolefin porous film; and a negative electrode plate, the positive electrode plate, the nonaqueous electrolyte secondary battery separator, and the negative electrode plate being arranged in this order, wherein the polyolefin porous film has a puncture strength of equal to or greater than 26.0 $gf/g/m^2$, which puncture strength is measured with respect to a weight per unit area of the polyolefin porous film, and wherein the polyolefin porous film has a value in a range of 0.00 to 0.54, the positive electrode plate has a value in a range of 0.00 to 0.50, and the negative electrode plate has a value in a range of 0.00 to 0.50, where each of the values is represented by the following Formula (1):

$$|1-T/M| \qquad (1)$$

where T represents a distance by which the polyolefin porous film, the positive electrode plate, or the negative electrode plate moves in a traverse direction from a starting point of measurement to a point where a critical load is obtained in a scratch test under a constant load of 0.1 N, and M represents a distance by which the polyolefin porous film, the positive electrode plate, or the negative electrode plate moves in a machine direction from a starting point of measurement to a point where a critical load is obtained in a scratch test under a constant load of 0.1 N.

Advantageous Effects of Invention

A nonaqueous electrolyte secondary battery in accordance with an embodiment of the present invention or a nonaqueous electrolyte secondary battery into which a nonaqueous electrolyte secondary battery member in accordance with an embodiment of the present invention is excellent in battery characteristics.

DESCRIPTION OF EMBODIMENTS

Figure 1:
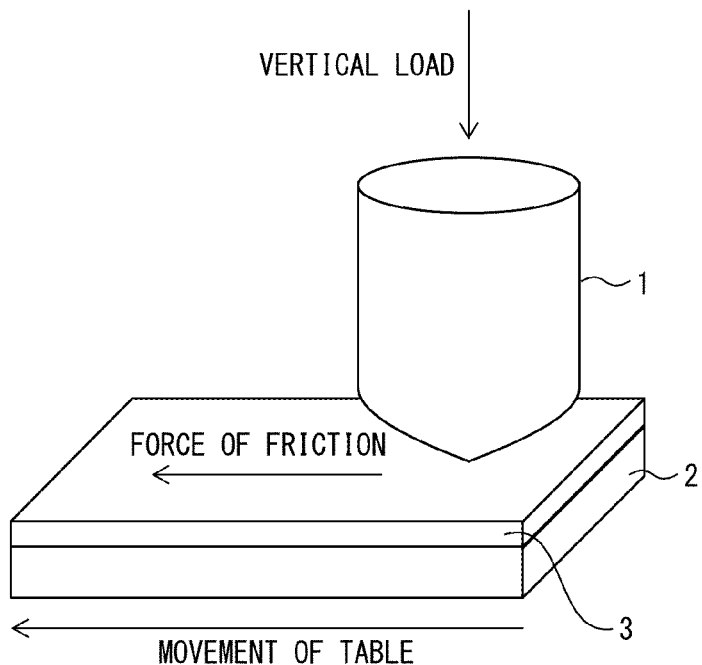
FIG. 1 is a view illustrating (i) a device used in a scratch test in accordance with an embodiment of the present invention and (ii) an operation of the device.

The following description will discuss an embodiment of the present invention in detail. Note that numerical expressions such as "A to B" herein mean "not less than A and not more than B".

Embodiment 1: Nonaqueous Electrolyte Secondary Battery

A nonaqueous electrolyte secondary battery in accordance with Embodiment 1 of the present invention is a nonaqueous electrolyte secondary battery including: a positive electrode plate; a nonaqueous electrolyte secondary battery separator containing a polyolefin porous film; and a negative electrode plate, wherein the polyolefin porous film has a puncture strength of equal to or greater than 26.0 $gf/g/m^2$, which puncture strength is measured with respect to a weight per unit area of the polyolefin porous film, and wherein the polyolefin porous film has a value in a range of 0.00 to 0.54, the positive electrode plate has a value in a range of 0.00 to 0.50, and the negative electrode plate has a value in a range of 0.00 to 0.50, where each of the values is represented by the following Formula (1):

$$|1-T/M| \tag{1}$$

where T represents a distance by which the polyolefin porous film, the positive electrode plate, or the negative electrode plate moves in a traverse direction (TD) from a starting point of measurement to a point where a critical load is obtained in a scratch test under a constant load of 0.1 N, and M represents a distance by which the porous film moves in a machine direction from a starting point of measurement to a point where a critical load is obtained in a scratch test under a constant load of 0.1 N (these distances may be hereinafter referred to as "critical load distance").

Note that a nonaqueous electrolyte secondary battery in accordance with an embodiment of the present invention includes not only the above-described positive electrode plate, negative electrode plate, and nonaqueous electrolyte secondary battery separator, but also other component(s) such as a nonaqueous electrolyte.

<Nonaqueous Electrolyte Secondary Battery Separator>

A nonaqueous electrolyte secondary battery separator in accordance with an embodiment of the present invention includes a polyolefin porous film (hereinafter also referred to as "porous film").

The porous film itself can be the nonaqueous electrolyte secondary battery separator. The porous film itself can also be a base material of a laminated separator in which a porous layer (described later) is disposed on the porous film. The porous film contains polyolefin-based resin as a main component and has a large number of pores therein, which pores are connected to one another, so that a gas and a liquid can pass through the porous film from one surface of the porous film to the other.

The polyolefin porous film contains a polyolefin-based resin at a proportion of not less than 50% by volume, preferably not less than 90% by volume, and more preferably not less than 95% by volume, relative to the whole porous film. The polyolefin-based resin more preferably contains a high molecular weight component having a weight-average molecular weight of $5\times10^5$ to $15\times10^6$. In particular, the polyolefin-based resin more preferably contains a high molecular weight component having a weight-average molecular weight of not less than 1,000,000 because such a polyolefin-based resin allows for an increase in strength of (i) the nonaqueous electrolyte secondary battery separator which is the porous film and (ii) the nonaqueous electrolyte secondary battery laminated separator which includes the porous film.

Examples of the polyolefin-based resin which the polyolefin porous film contains encompass, but are not particularly limited to, homopolymers (for example, polyethylene, polypropylene, and polybutene) and copolymers (for example, ethylene-propylene copolymer) both of which are thermoplastic resins and are each produced through (co)polymerization of a monomer(s) such as ethylene, propylene, 1-butene, 4-methyl-1-pentene, and/or 1-hexene. The polyolefin porous film may contain only one of these polyolefin-based resins or may contain two or more of these polyolefin-based resins. Among these, polyethylene is more preferable as it is capable of preventing (shutting down) a flow of an excessively large electric current at a lower temperature. A high molecular weight polyethylene containing ethylene as a main component is particularly preferable. Note that the polyolefin porous film can contain a component(s) other than polyolefin as long as such a component does not impair the function of the layer. Examples of the polyethylene encompass low-density polyethylene, high-density polyethylene, linear polyethylene (ethylene-α-olefin copolymer), and ultra-high molecular weight polyethylene having a weight-average molecular weight of not less than 1,000,000. Among these examples, ultra-high molecular weight polyethylene having a weight-average molecular weight of not less than 1,000,000 is preferable. It is particularly preferable that the polyethylene contain a high molecular weight component having a weight-average molecular weight of $5\times10^5$ to $15\times10^6$.

In a case where the porous film itself is to be the nonaqueous electrolyte secondary battery separator, a thickness of the porous film is preferably 4 μm to 40 μm, more preferably 5 μm to 30 μm, and still more preferably 6 μm to 15 μm. In a case where the porous film is used as a base material of the laminated separator and where the nonaqueous electrolyte secondary battery laminated separator (laminated body) is formed by disposing the porous layer on one surface or both surfaces of the porous film, the thickness of the porous film is preferably 4 μm to 40 μm, and more preferably 5 μm to 30 μm, although the thickness can be decided as appropriate in view of a thickness of the laminated body.

If the thickness of the porous film is below the above range, then a nonaqueous electrolyte secondary battery, which includes the porous film, makes it impossible to sufficiently prevent an internal short circuit of the battery, which internal short circuit is caused by breakage or the like of the battery. In contrast, if the thickness of the porous film is above the range, then there occurs an increase in resistance to permeation of lithium ions. This causes a positive electrode plate of a nonaqueous electrolyte secondary battery, which includes the separator, to deteriorate in a case where a charge-discharge cycle is repeated. Consequently, a rate characteristic and/or a cycle characteristic deteriorate(s).

A weight per unit area of the porous film is decided as appropriate in view of strength, thickness, weight, and handleability of the nonaqueous electrolyte secondary battery separator including the porous film. Specifically, the weight per unit area of the porous film is preferably 4 g/m² to 20 g/m², more preferably 4 g/m² to 12 g/m², and still more preferably 5 g/m² to 10 g/m² so that the nonaqueous electrolyte secondary battery in accordance with an embodiment of the present invention, which includes the nonaqueous electrolyte secondary battery separator, can have high energy density per unit weight and high energy density per unit volume.

Puncture strength with respect to a weight per unit area of the porous film is equal to or greater than 26.0 gf/g/m², and is preferably equal to or greater than 30.0 gf/g/m². If the puncture strength is excessively small, that is, if the puncture strength is less than 26.0 gf/g/m², then it may allow the separator to be punctured by positive electrode active material particles and negative electrode active material particles in a case where, for example, (i) an operation of laminating and winding a positive electrode plate, a negative electrode plate, and the separator is carried out during a battery assembling process, (ii) an operation of pressing and tightening rolls is carried out during a battery assembling process, or (iii) the battery is pressured from outside. This may cause a short circuit between the positive electrode and the negative electrode.

The porous film has an air permeability of preferably 30 sec/100 mL to 500 sec/100 mL, more preferably 50 sec/100 mL to 300 sec/100 mL, in terms of Gurley values. The porous film having an air permeability which falls within these ranges allows a nonaqueous electrolyte secondary battery separator including the porous film to achieve sufficient ion permeability.

The porous film has a porosity of preferably 20% by volume to 80% by volume, more preferably 30% by volume to 75% by volume, so as to (i) retain a larger amount of electrolyte and (ii) obtain the function of reliably preventing (shutting down) a flow of an excessively large electric current at a lower temperature. If the porosity of the porous film is below 20% by volume, then a resistance to ion permeation of the porous film increases. If the porosity of the porous film is above 80% by volume, then mechanical strength of the porous film decreases.

Further, the porous film has pores each having a pore size of preferably not larger than 0.3 μm, more preferably not larger than 0.14 μm so that (i) a nonaqueous electrolyte secondary battery separator including the porous film can have sufficient ion permeability and (ii) it is possible to prevent particles from entering the positive electrode or the negative electrode.

[Positive Electrode Plate]

A positive electrode plate in accordance with an embodiment of the present invention has a value in a range of 0.00 to 0.50, which value is represented by the following Formula (1):

$$|1 - T/M| \qquad (1)$$

where T represents a critical load distance in a traverse direction in a scratch test under a constant load of 0.1 N, and M represents a critical load distance in a machine direction in a scratch test under a constant load of 0.1 N. The positive electrode plate is ordinarily a sheet-shaped positive electrode plate including (i) a positive electrode mix containing a positive electrode active material, an electrically conductive agent, and a binding agent and (ii) a positive electrode current collector supporting the positive electrode mix thereon. Note that the positive electrode plate may be such that the positive electrode current collector supports the positive electrode mix on both surfaces thereof or one of the surfaces thereof.

The positive electrode active material is, for example, a material capable of being doped with and dedoped of lithium ions. Such a material is preferably transition metal oxide. Examples of the transition metal oxide encompass lithium complex oxides containing at least one transition metal including, for example, V, Mn, Fe, Co, and Ni. Among such lithium complex oxides, (i) a lithium complex oxide having an α-NaFeO₂ structure such as lithium nickelate and lithium cobaltate and (ii) a lithium complex oxide having a spinel structure such as lithium manganese spinel are preferable because such lithium complex oxides have a high average discharge potential. The lithium complex oxide may further contain any of various metallic elements, and is more preferably complex lithium nickelate.

Further, the complex lithium nickelate even more preferably contains at least one metallic element selected from the group consisting of Ti, Zr, Ce, Y, V, Cr, Mn, Fe, Co, Cu, Ag, Mg, Al, Ga, In, and Sn at a proportion of 0.1 mol % to 20 mol % with respect to the sum of the number of moles of the at least one metallic element and the number of moles of Ni in the lithium nickelate. This is because such a complex lithium nickelate allows an excellent cycle characteristic for use in a high-capacity battery. An active material that contains Al or Mn and that contains Ni at a proportion of not less than 85%, further preferably not less than 90%, is particularly preferable because a nonaqueous electrolyte secondary battery including a positive electrode plate containing the above active material has an excellent cycle characteristic for use as a high-capacity battery.

Examples of the electrically conductive agent encompass carbonaceous materials such as natural graphite, artificial graphite, cokes, carbon black, pyrolytic carbons, carbon fiber, and a fired product of an organic polymer compound. It is possible to use (i) only one kind of the above electrically conductive agents or (ii) two or more kinds of the above electrically conductive agents in combination, for example, a mixture of artificial graphite and carbon black.

Examples of the binding agent encompass thermoplastic resins such as polyvinylidene fluoride, a copolymer of vinylidene fluoride, polytetrafluoroethylene, a tetrafluoroethylene-hexafluoropropylene copolymer, a tetrafluoroethylene-perfluoroalkyl vinyl ether copolymer, an ethylene-tetrafluoroethylene copolymer, a vinylidene fluoride-hexafluoropropylene copolymer, a vinylidene fluoridehexafluoropropylene-tetrafluoroethylene copolymer, a thermoplastic polyimide, polyethylene, and polypropylene, as well as acrylic resin and styrene-butadiene-rubber. The binder functions also as a thickening agent.

The positive electrode mix may be prepared by, for example, a method of applying pressure to the positive electrode active material, the electrically conductive agent, and the binding agent on the positive electrode current collector or a method of using an appropriate organic solvent so that the positive electrode active material, the electrically conductive agent, and the binding agent are in a paste form.

Examples of the positive electrode current collector encompass electric conductors such as Al, Ni, and stainless steel. Among these, Al is preferable as it is easy to process into a thin film and less expensive.

The sheet-shaped positive electrode plate may be produced, that is, the positive electrode mix may be supported by the positive electrode current collector, through, for example, a method of applying pressure to the positive electrode active material, the electrically conductive agent, and the binding agent on the positive electrode current collector to form a positive electrode mix thereon or a method of (i) using an appropriate organic solvent so that the positive electrode active material, the electrically conductive agent, and the binding agent are in a paste form to provide a positive electrode mix, (ii) applying a coating of the positive electrode mix to the positive electrode current collector, (iii) drying the applied positive electrode mix to prepare a sheet-shaped positive electrode mix, and (iv) applying pressure to the sheet-shaped positive electrode mix so that the sheet-shaped positive electrode mix is firmly fixed to the positive electrode current collector.

[Negative Electrode Plate]

A negative electrode plate in accordance with an embodiment of the present invention has a value in a range of 0.00 to 0.50, which value is represented by the following Formula (1):

$$|1-T/M| \tag{1}$$

where T represents a critical load distance in a traverse direction in a scratch test under a constant load of 0.1 N, and M represents a critical load distance in a machine direction in a scratch test under a constant load of 0.1 N. The negative electrode plate is ordinarily a sheet-shaped negative electrode plate including (i) a negative electrode mix containing a negative electrode active material, and (ii) a negative electrode current collector supporting the negative electrode mix thereon. Note that the negative electrode plate may be such that the negative electrode current collector supports the negative electrode mix on both surfaces thereof or one of the surfaces thereof. The sheet-shaped negative electrode plate preferably contains the above-described electrically conductive agent and binding agent.

Examples of the negative electrode active material encompass (i) a material capable of being doped with and dedoped of lithium ions, (ii) lithium metal, and (iii) lithium alloy. Specific examples of the material encompass carbonaceous materials such as natural graphite, artificial graphite, cokes, carbon black, pyrolytic carbons, carbon fiber, and a fired product of an organic polymer compound; chalcogen compounds such as an oxide and a sulfide that are doped with and dedoped of lithium ions at an electric potential lower than that for the positive electrode plate; metals that can be alloyed with an alkali metal such as aluminum (Al), lead (Pb), tin (Sn), bismuth (Bi), and silicon (Si); cubic-crystal intermetallic compounds (for example, AlSb, $Mg_2Si$, and $NiSi_2$) of which an alkali metal is insertable into the lattice; and a lithium nitrogen compound such as $Li_{3-x}M_xN$ (where M is a transition metal). Among the above negative electrode active materials, a carbonaceous material containing graphite is preferable because such a carbonaceous material has high electric potential flatness and low average discharge potential, and can thus be combined with a positive electrode to achieve a high energy density. A carbonaceous material containing a graphite material such as natural graphite or artificial graphite as a main component is more preferable. The negative electrode active material may alternatively be a mixture of graphite and silicon, preferably containing Si at a proportion of not less than 5%, more preferably not less than 10%, with respect to carbon (C) which constitutes the graphite.

The negative electrode mix may be prepared by, for example, a method of applying pressure to the negative electrode active material on the negative electrode current collector or a method of using an appropriate organic solvent so that the negative electrode active material is in a paste form.

Examples of the negative electrode current collector encompass Cu, Ni, and stainless steel. Among these, Cu is preferable as it is not easily alloyed with lithium in the case of a lithium-ion secondary battery in particular and is easily processed into a thin film.

The sheet-shaped negative electrode plate may be produced, that is, the negative electrode mix may be supported by the negative electrode current collector, through, for example, a method of applying pressure to the negative electrode active material on the negative electrode current collector to form a negative electrode mix thereon or a method of (i) using an appropriate organic solvent so that the negative electrode active material is in a paste form to provide a negative electrode mix, (ii) applying a coating of the negative electrode mix to the negative electrode current collector, (iii) drying the applied negative electrode mix to prepare a sheet-shaped negative electrode mix, and (iv) applying pressure to the sheet-shaped negative electrode mix so that the sheet-shaped negative electrode mix is firmly fixed to the negative electrode current collector. The above paste preferably includes the above electrically conductive agent and the binding agent.

(Scratch Test)

As illustrated in FIG. 1, "scratch test" in accordance with an embodiment of the present invention is a test for measuring stress that occurs in a distance by which a measurement target object such as a porous film, a positive electrode plate, and a negative electrode plate is moved in a horizontal direction while a surface layer of the measurement target object is subjected to compressive deformation in a thicknesswise direction by applying a certain load to an indenter (i.e. while the indenter is pressed down). Specifically, the scratch test is carried out by the following steps:

(1) A measurement target object 3 (porous film, a positive electrode plate, or a negative electrode plate) is cut into a piece of 20 mm×60 mm. Then, a diluted glue solution which has been obtained by diluting Arabic Yamato aqueous liquid glue (manufactured by YAMATO Co., Ltd.) with water by a 5-fold dilution factor is applied to an entire surface of a glass preparation (substrate 2) of 30 mm×70 mm so that the weight per unit area of the diluted glue solution is approximately 1.5 g/m². The cut piece of the measurement target object 3 and the substrate 2 are bonded together via the diluted glue solution having been applied to the substrate 2. Thereafter, a resulting laminated material is dried at a temperature of 25° C. for one whole day and night, so that a test sample is prepared. Note that the cut piece of the measurement target object 3 and the glass preparation (substrate 2) are to be bonded together with care so that no air bubble is made between the cut piece of the measurement target object 3 and the glass preparation. Note that in a case where the measurement target object 3 is an electrode plate (a positive electrode plate or a negative electrode plate), a resulting test sample is prepared in such a manner that a mix layer (a positive electrode mix layer or a negative electrode mix layer) of the electrode plate serves as an upper surface of the test sample which upper surface is to contact a diamond indenter 1 (described later).

(2) The test sample prepared in the step (1) is placed on a microscratch testing device (manufactured by CSEM Instruments). Then, while the diamond indenter 1 (in a conical shape having an apex angle of 120° and having a tip whose radius is 0.2 mm) of the testing device is applying a vertical load of 0.1 N to the test sample, a table of the testing device is moved by a distance of 10 mm in a traverse direction (TD) of the measurement target object at a speed of 5 mm/min. During the movement of the table, stress (force of friction) that occurs between the diamond indenter 1 and the test sample is measured.

Figure 2:
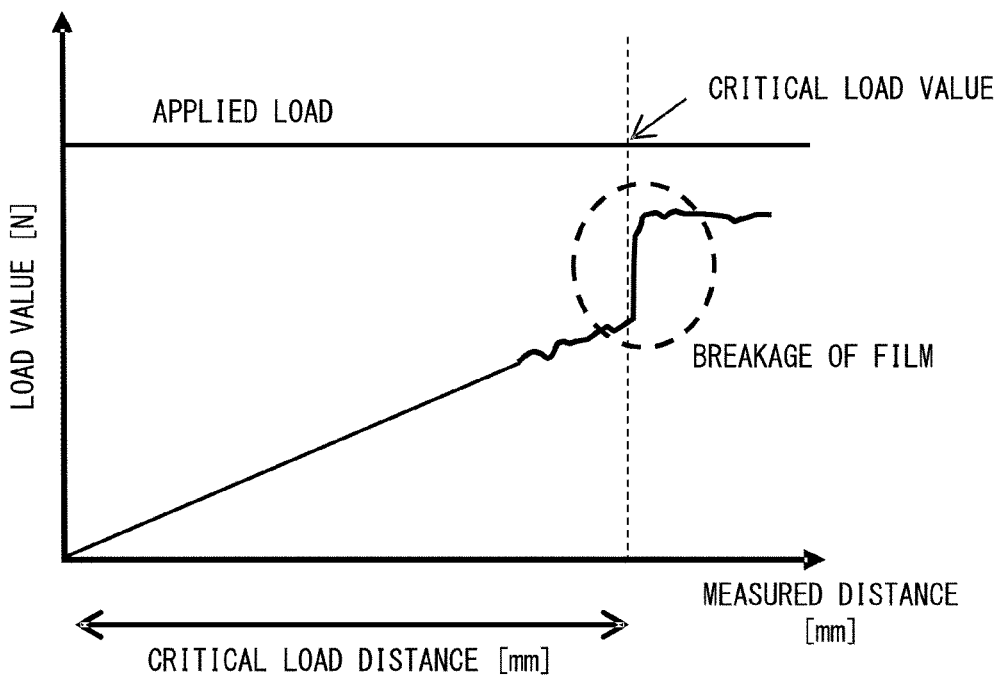
FIG. 2 is a graph which is plotted based on results of a scratch test in accordance with an embodiment of the present invention to show (i) a critical load value and (ii) a distance by which a porous film moves from a starting point of measurement to a point where a critical load is obtained.

(3) A line graph, which shows a relationship between a displacement of the stress measured in the step (2) and the distance of the movement of the table, is made. Then, based on the line graph, the following are calculated as illustrated in FIG. 2: (i) a critical load value in the traverse direction (TD) and (ii) a distance (critical load distance) in the traverse direction between a starting point of measurement and a point where the critical load is obtained.

(4) The direction of the movement of the table is changed to a machine direction (MD), and the above steps (1) through (3) are repeated. Then, the following are calculated: (i) a critical load value in the machine direction and (ii) the distance (critical load distance) in the machine direction between a starting point of measurement and a point where the critical load is obtained.

Note that any conditions and the like for the measurement in the scratch test other than the conditions described above are similar to those disclosed in JIS R 3255.

The "MD" as used herein refers to a lengthwise direction of a polyolefin porous film, a positive electrode plate, and a negative electrode plate, and the "TD" as used herein refers to a direction orthogonal to the MD.

Note, however, that in a case where a polyolefin porous film, a positive electrode plate, or a negative electrode plate is shaped in a square, the MD is a direction which is parallel to any of edges of the square, and the TD is a direction orthogonal to the MD.

The scratch test conducted on a porous film as a measurement target object measures and calculates the following effect in a nonaqueous electrolyte secondary battery. Specifically, the scratch test measures and calculates, by modeling a mechanism of the effect which expansion and shrinkage of an electrode mix layer during battery charge/discharge (a negative electrode plate expands during charge, and a positive electrode plate expands during discharge) have on a nonaqueous electrolyte secondary battery separator.

The expansion and shrinkage of the electrode mix layer during charge/discharge causes a surface layer of the nonaqueous electrolyte secondary battery separator (porous film), which surface layer faces the expanded electrode mix layer, to be deformed (compressive deformation) in a thicknesswise direction, and also causes shearing stress (force which occurs in the horizontal direction and which occurs at the interface between the separator and the electrode) to occur via the electrode mix layer expanded in the horizontal direction. In a case where the nonaqueous electrolyte secondary battery separator includes a porous layer, the shearing stress further occurs on the porous film via the porous layer. Furthermore, the shearing stress is transferred, via a resin inside the nonaqueous electrolyte secondary battery separator, to an interface between the nonaqueous electrolyte secondary battery separator and an electrode, which interface is opposite from the expanded electrode.

Therefore, a critical load distance calculated by the scratch test serves as (a) an indicator of how easily a surface layer of a porous film (nonaqueous electrolyte secondary battery separator) is plastically-deformed and (b) an indicator of how easily shearing stress is transferred to a surface opposite a measured surface. If a critical load distance is long, then it indicates that (a') a surface layer of a porous film to be measured is unlikely be plastically-deformed and (b') shearing stress is unlikely (difficult) to be transferred to a surface opposite a measured surface of the porous film to be measured.

Here, a porous film in accordance with an embodiment of the present invention has a value represented by the following Formula (1), which value is in a range of 0.00 to 0.54, preferably 0.00 to 0.50, and more preferably 0.00 to 0.45:

$$|1-T/M| \tag{1}$$

where T represents a critical load distance in a traverse direction in a scratch test under a constant load of 0.1 N, and M represents a critical load distance in a machine direction in a scratch test under a constant load of 0.1 N.

Further, a porous film in accordance with an embodiment of the present invention has a value represented by the following Formula (2), which value is in a range of 0.00 to 0.54, preferably 0.00 to 0.50, and more preferably 0.00 to 0.45:

$$1-T/M \tag{2}$$

where T and M represent the respective critical load distances represented by T and M in Formula (1).

The respective values represented by the Formula (1) and the Formula (2) are each a value representing anisotropy of a critical load distance in a scratch test carried out on a porous film. A value that is close to zero indicates that the critical load distance is more isotropic.

Hence, a porous film, which has a value beyond 0.54 as represented by the Formula (1), shows that there exists large anisotropy between a critical load distance in a traverse direction and a critical load distance in a machine direction. In a case of a nonaqueous electrolyte secondary battery in which a porous film having large anisotropy is included as a separator or as a member of a separator, a plastic deformation of a surface layer of the separator (porous film), which plastic deformation (factor A) occurs as a result of charge/discharge, occurs predominantly in a certain direction. Also, since the degree of transferability of surface stress to a surface opposite a surface facing an expanded electrode varies between a traverse direction and a machine direction, a wrinkle and a gap at an interface between the separator and the electrode (factor B) occurs predominantly in a certain direction. These factors A and B lead to a decrease in plane direction-uniformity in distance between the electrodes. This causes a reduction in rate characteristic maintaining ratio of the nonaqueous electrolyte secondary battery after a charge-discharge cycle.

The following description will discuss a nonaqueous electrolyte secondary battery configured so that a laminated body is wound. This configuration is one aspect of a laminated body including (i) electrodes and (ii) a separator which is a porous film or which includes a porous film as a member thereof. In the nonaqueous electrolyte secondary battery configured so that the laminated body is wound, the laminated body is wound while tensile force is being applied in a machine direction to the separator. This causes an increase in smoothness in the machine direction of the porous film, and causes internal stress to be inwardly applied to an axis extending in a traverse direction. Therefore, according to the nonaqueous electrolyte secondary battery configured so that the laminated body is wound, (i) a critical load distance in the machine direction during actual operation is longer than a critical load distance, in a machine direction, which is calculated by the scratch test and (ii) a critical load distance in the traverse direction during actual operation is shorter than a critical load distance, in a traverse direction, which is calculated in the scratch test. Therefore, in a case where a critical load distance in the traverse direction and a critical load distance in the machine direction are similar (i.e. highly isotropic), specifically, in a case where a porous film having a value of equal to or greater than −0.54 and less than 0.00 as represented by the Formula (2) is used as a separator or as a member of a separator in a nonaqueous electrolyte secondary battery configured so that a laminated body is wound, the critical load distance in the machine direction increases, so that the critical load distance in the traverse direction decreases. Therefore, in actual operation, (i) a plastic deformation of the surface layer of the separator (porous film) in the traverse direction and (ii) a wrinkle and a gap at the interface between the separator and the electrode due to a difference in transferability of surface stress to a surface opposite the surface facing the electrode which expanded in the machine direction occur predominantly in the transverse direction. This causes a decrease in plane direction-uniformity in distance between the electrodes. Meanwhile, in a case where a nonaqueous electrolyte secondary battery configured so that the laminated body is wound has highly anisotropic critical load distances in a traverse direction and in the machine direction, specifically, in a case where the value obtained by the Formula (1) is beyond 0.54, the occurrences of (i) a plastic deformation of a surface layer of the nonaqueous electrolyte secondary battery separator (porous film) and (ii) a wrinkle and a gap at an interface between the separator and the expanded electrode due to a difference between a traverse direction and a machine direction in terms of transferability of surface stress to a surface opposite the surface facing the expanded electrode, increase in a direction in which a critical load distance is longer, for a reason similar to the reason described above. This causes a reduction in a rate characteristic maintaining ratio of the nonaqueous electrolyte secondary battery after a charge-discharge cycle. Therefore, the value obtained by the Formula (2) is preferably in a range of 0.00 to 0.54 in view of the fact that, with such a value, a porous film can be suitably used for a nonaqueous electrolyte secondary battery configured so that the laminated body is wound.

The scratch test conducted on an electrode plate (a positive electrode plate or a negative electrode plate) as a measurement target object (i) models stress transfer inside an electrode mix layer (electrode active material particles (positive electrode active material particles or negative electrode active material particles)) due to expansion and shrinkage of the electrode mix layer along with charge/discharge of a nonaqueous electrolyte secondary battery into which the electrode plate is incorporated, and (ii) measures and calculates uniformity of the stress transfer.

Further, in the scratch test conducted on an electrode plate as a measurement target object, a measured critical load distance is affected by uniformity of a surface layer (electrode mix layer) of the electrode plate, the degree of alignment of particles present on a surface of the electrode mix layer of the electrode plate, the shape of the particles (e.g., aspect ratio of the particles), and the particle diameter of the particles.

Here, a positive electrode plate in accordance with an embodiment of the present invention has a value represented by the following Formula (1), which value is in a range of 0.00 to 0.50, preferably 0.00 to 0.47, and more preferably 0.00 to 0.45.

Further, a negative electrode plate in accordance with an embodiment of the present invention has a value represented by the following Formula (1), which value is in a range of 0.00 to 0.50, preferably 0.00 to 0.49, and more preferably 0.00 to 0.45:

$$|1-T/M| \qquad (1)$$

where T represents a critical load distance in a traverse direction in a scratch test under a constant load of 0.1 N, and M represents a critical load distance in a machine direction in a scratch test under a constant load of 0.1 N.

The values represented by the Formula (1) are each a value representing anisotropy of a critical load distance in a scratch test on each electrode plate. A value that is close to zero indicates that the critical load distance is more isotropic.

Hence, an electrode plate, which has a value beyond 0.50 as represented by the Formula (1), shows that there exists large anisotropy between a critical load distance in a traverse direction and a critical load distance in a machine direction. An electrode plate having the large anisotropy described above has a small surface uniformity. This may cause insufficient adhesiveness between the electrode plate and the nonaqueous electrolyte secondary battery separator and may cause insufficient plane direction-uniformity in electrode-to-electrode distance. This may, in turn, deteriorate an initial rate characteristic of a nonaqueous electrolyte secondary battery including the electrode.

In a nonaqueous electrolyte secondary battery including an electrode plate having the large anisotropy, stress is transferred nonuniformly inside an electrode mix layer due to expansion and shrinkage of electrode active material particles along with charge/discharge of the nonaqueous electrolyte secondary battery. This causes voids inside the electrode mix layer to have nonuniform diameters and to be distributed nonuniformly, and also causes stress inside the electrode mix layer to occur in a localized direction. This results in, during a charge-discharge cycle, disconnection of an electrically conductive path inside the electrode mix layer, separation of an electrode active material and an electrically conductive agent from a binding agent (binder), and decrease in adhesiveness between a current collector and the electrode mix layer. This may deteriorate battery characteristics such as a rate characteristic maintaining ratio of the nonaqueous electrolyte secondary battery after a charge-discharge cycle.

Examples of a method by which a value represented by Formula (1) is adjusted for an electrode plate (a positive electrode plate and a negative electrode plate) encompass: a method of adjusting a particle diameter of electrode active material particles, which serves as a material for an electrode plate, and/or an aspect ratio of the electrode active material particles; a method of applying a coating of an electrode mix (a positive electrode mix or a negative electrode mix) onto a current collector at a specific coating shear rate during formation of an electrode plate, to adjust an alignment property of electrode active material particles and/or a porosity of a resulting electrode mix layer; and a method of adjusting a compounding ratio at which an electrode active material, an electrically conductive agent, and a binding agent, which are materials for an electrode plate, are mixed to control a composition ratio of a resulting electrode plate (electrode mix layer).

Among the above methods, preferably are, specifically, controlling the particle diameter of the electrode active material particles to fall within a range of 1 μm to 20 μm, controlling the aspect ratio (long diameter-to-short diameter ratio) of the electrode active material particles to fall within a range of 1 to 5, controlling a coating line speed to fall within a range of 10 m/sec to 200 m/sec, controlling the porosity of the electrode plate (porosity of the electrode mix layer) to fall within a range of 10% to 50%, and controlling a proportion of an active material component present in a composition of an electrode plate to fall within a range of equal to or greater than 80% by weight. By controlling the respective production conditions and the like described above to fall within suitable ranges, it is possible to suitably control a value represented by Formula (1) for an electrode plate to fall within a range of 0.00 to 0.50.

A porosity ($\varepsilon$) of an electrode mix layer can be calculated, by the formula below, from a density $\rho$ (g/m$^3$) of an electrode mix layer, respective mass compositions (wt %) $b^1$, $b^2$, ... $b^n$ of materials that constitute the electrode mix layer (e.g., a positive electrode active material, an electrically conductive agent, a binding agent, and others), and respective real densities (g/m$^3$) $c^1$, $c^2$, ... $c^n$ of these materials. Note here that the real densities of the materials may be literature data or may be measured values obtained by a pycnometer method.

$$\varepsilon = 1 - \{\rho \times (b^1/100)/c^1 + \rho \times (b^2/100)/c^2 + \ldots \rho \times (b^n/100)/c^n\} \times 100$$

[Method of Producing Porous Film]

A method of producing the porous film is not limited to any particular one. Examples of the method encompass a method in which (i) a plasticizer is added to a resin such as polyolefin, (ii) a resultant mixture is formed into a film, and (iii) the plasticizer is removed with the use of a proper solvent.

Specifically, in a case where, for example, a porous film is produced with the use of a polyolefin resin including ultra-high molecular weight polyethylene and low molecular weight polyolefin having a weight-average molecular weight of equal to or less than 10,000, the porous film is, in view of production costs, preferably produced by the following method.

A method of obtaining a porous film, including the steps of:
(1) kneading 100 parts by weight of ultra-high molecular weight polyethylene, 5 parts by weight to 200 parts by weight of low molecular weight polyolefin having a weight-average molecular weight of not more than 10,000, and 100 parts by weight to 400 parts by weight of a pore forming agent such as calcium carbonate or a plasticizer, so that a polyolefin resin composition is obtained;
(2) rolling the polyolefin resin composition, so as to form a rolled sheet;
(3) removing the pore forming agent from the rolled sheet;
(4) stretching the sheet from which the pore forming agent has been removed in the step (3), so as to obtain a stretched sheet; and
(5) heat fixing the stretched sheet at a heat fixing temperature of 100° C. to 150° C.

Alternatively, a method of obtaining a porous film, including the steps of:
(1) kneading 100 parts by weight of ultra-high molecular weight polyethylene, 5 parts by weight to 200 parts by weight of low molecular weight polyolefin having a weight-average molecular weight of not more than 10,000, and 100 parts by weight to 400 parts by weight of a pore forming agent such as calcium carbonate or a plasticizer, so that a polyolefin resin composition is obtained;
(2) rolling the polyolefin resin composition, so as to form a rolled sheet;
(3') stretching the rolled sheet, so as to obtain a stretched sheet;
(4') removing the pore forming agent from the stretched sheet; and
(5') heat fixing the stretched sheet at a heat fixing temperature of 100° C. to 150° C.

Here, a critical load distance in a traverse direction and a critical load distance in a machine direction are considered to be greatly affected by the following structure factors of a porous film:
(i) How polymers in a resin are aligned in the machine direction of the porous film
(ii) How polymers in a resin are aligned in the traverse direction of the porous film
(iii) How the polymers in the resin aligned in the machine direction and the polymers in the resin aligned in the traverse direction are in contact with each other with respect to a thicknesswise direction of the porous film Therefore, respective values obtained by the Formula (1) and the Formula (2) can be controlled by, for example, controlling the above structure factors (i) through (iii) through adjusting the following production conditions:
(1) Circumferential velocity [m/min] of a reduction roller
(2) Ratio of stretch temperature to stretch magnification [° C./times]

Specifically, the circumferential velocity of the reduction roller and the ratio of the stretch temperature to the stretch magnification during stretching are adjusted so that the circumferential velocity of the reduction roller, the stretch temperature during stretching, and the stretch magnification satisfy the relationship of a Formula (3) below, provided that production of the porous film is not impaired. This allows the respective values obtained by the Formula (1) and the Formula (2) to be each controlled in a range of 0.00 to 0.54.

$$Y \geq -2.3 \times X + 22.2 \quad (3)$$

where X represents the circumferential velocity of the reduction roller, and Y represents the ratio of the stretch temperature to the stretch magnification during stretching in the traverse direction.

Meanwhile, in a case where the ratio is set so as to fall outside the range satisfying the relationship of the above Formula (3), (i) the alignment of the polymers in the resin in the machine direction of the porous film or the alignment of the polymers in the resin in the traverse direction of the porous film is promoted and/or (ii) connectivity, in a thicknesswise direction of the porous film, of the polymers in the resin aligned in the machine direction or of the polymers in the resin aligned in the traverse direction is promoted. This causes the anisotropy of the porous film as represented by the Formula (1) to be large, so that it is not possible to control the value obtained by the Formula (1) to fall within the range of 0.00 to 0.54. For example, in a case where the circumferential velocity of the reduction roller is adjusted to 2.5 m/min and where the ratio of the stretch temperature to the stretch magnification is adjusted to less than 16.5° C./times, (i) the alignment of the polymers in the resin in the traverse direction of the porous film increases and (ii) the thicknesswise direction-wise connectivity of the polymers in the resin aligned in the traverse direction increases. This causes a critical load distance in the traverse direction to be short, so that the anisotropy as represented by the Formula (1) to be equal to or greater than 0.54.

The stretch temperature is preferably 90° C. to 120° C., and more preferably 100° C. to 110° C. The stretch magnification is preferably 600% to 800%, and more preferably 620% to 700%.

Alternatively, a porous film satisfying the Formulas (1) and (2) can also be produced by (i) cooling the stretched sheet after the heat fixing and then (ii) repeatedly carrying out the stretching and the heat fixing. Specifically, a porous film satisfying the Formulas (1) and (2) can also be produced by, after the heat fixing, further stretching the stretched film in a machine direction and in a traverse direction, preferably in a machine direction.

Alternatively, a porous film satisfying the Formulas (1) and (2) can be produced by properly combining, as needed, other conditions such as a composition of the porous film and the heat fixing temperature.

[Porous Layer]

A nonaqueous electrolyte secondary battery in accordance with an embodiment of the present invention can include a publicly known porous layer(s), such as an adhesive layer, a heat-resistant layer, and a protective layer, disposed on a porous film. That is, a nonaqueous electrolyte secondary battery in accordance with an embodiment of the present invention can include a nonaqueous electrolyte secondary battery separator which includes (i) a porous film (base material) and (ii) a publicly known porous layer disposed on the porous film.

The porous layer is normally a resin layer containing a resin and may contain a filler (fine particles). The porous layer is preferably a heat-resistant layer or an adhesive layer to be disposed on one surface or both surfaces of the porous film. The resin contained in the porous layer is preferably (i) insoluble in the electrolyte of a nonaqueous electrolyte secondary battery in accordance with an embodiment of the present invention and (ii) electrochemically stable when the nonaqueous electrolyte secondary battery is in normal use. In a case where the porous layer is disposed on one surface of the porous film, the porous layer is preferably disposed on that surface of the porous film which surface faces a positive electrode plate of a nonaqueous electrolyte secondary battery to be produced, more preferably on that surface of the porous film which surface comes into contact with the positive electrode plate.

The resin contained in the porous layer is not limited to a specific resin. However, specific examples of the resin include polyolefins; fluorine-containing resins; and any of these fluorine-containing resins which is a fluorine-containing rubber having a glass transition temperature of equal to or less than 23° C.; aromatic polyamides; fully aromatic polyamides (aramid resins); resins with a melting point or glass transition temperature of not lower than 180° C.; and water-soluble polymers such as polyvinyl alcohol, polyethyleneglycol, cellulose ether, sodium alginate, polyacrylic acid, polyacrylamide, and polymethacrylic acid. The resin contained in the porous layer can be one kind of resin or can alternatively be a mixture of two or more kinds of resins.

A filler that can be contained in the porous layer can be organic fine particles or inorganic fine particles that can be typically used as a filler. Therefore, the above resins each have a function as a binder resin for binding (i) fillers (fine particles) together and (ii) fillers and the porous film. The filler is preferably electrically insulating fine particles.

The filler may include a combination of two or more kinds of fillers which differ from each other in particle diameter and/or specific surface area.

A filler content of the porous layer is preferably 1% by volume to 99% by volume, and more preferably 5% by volume to 95% by volume with respect to 100% by volume of the porous layer. In a case where the filler content falls within the above range, it is less likely for a void, which is formed when fine particles come into contact with each other, to be blocked by a resin or the like. This makes it possible to achieve sufficient ion permeability and a proper weight per unit area of the porous layer.

A thickness of the porous layer in accordance with an embodiment of the present invention can be decided as appropriate in view of a thickness of the laminated body which is the nonaqueous electrolyte secondary battery separator. Note, however, that in a case where the laminated body is formed by laminating the porous layer on one surface or both surfaces of the porous film serving as a base material, the thickness of the porous layer is preferably 0.5 µm to 15 µm (per single porous layer), and more preferably 2 µm to 10 µm (per single porous layer).

If a total thickness of both surfaces of the porous layer is less than 1 µm, it will be impossible to, in a case where the laminated body is used as a nonaqueous electrolyte secondary battery separator, sufficiently prevent an internal short circuit caused by, for example, breakage of the battery. If a total thickness of both surfaces of the porous layer is above 30 µm, the laminated body will have an increased resistance to permeation of lithium ions. Thus, repeating a charge-discharge cycle will degrade the positive electrode plate, with the result of a degraded rate characteristic and a degraded cycle characteristic.

<Method of Producing Porous Layer and Method of Producing Nonaqueous Electrolyte Secondary Battery Laminated Separator>

A method of producing the above porous layer and a method of producing the above laminated separator are not limited to a specific method. However, the above porous layer and the above laminated separator can be each produced by, for example, applying a coating solution (described later) to a surface of the porous film and then drying the coating solution so as to deposit the porous layer.

The coating solution can be prepared normally by (i) dissolving, in a solvent, a resin to be contained in the porous layer and (ii) dispersing, in the solvent, a filler to be contained in the porous layer in accordance with an embodiment of the present invention.

The solvent (disperse medium) can be any solvent which (i) does not adversely influence the porous film, (ii) allows the resin to be dissolved uniformly and stably, and (iii) allows the filler to be dispersed uniformly and stably.

The coating solution may be prepared by any method that allows the coating solution to satisfy conditions such as the resin solid content (resin concentration) and the filler amount that are necessary to produce a desired porous layer.

The coating solution may contain an additive(s) such as a dispersing agent, a plasticizing agent, a surface active agent, and a pH adjusting agent as a component(s) other than the resin and the filler as long as such an additive does not prevent an object of the present invention from being attained. Note that the additive may be contained in an amount that does not prevent the object of an embodiment of the present invention from being attained.

The coating solution may be applied to the porous film by any method, that is, a porous layer may be formed on a surface of a porous film that may have been subjected to a hydrophilization treatment as necessary, by any method that can achieve a necessary weight per unit area and a necessary coating area.

The solvent (dispersion medium) is typically removed by a drying method. The above drying can be carried out with the use of a normal drying device.

[Nonaqueous Electrolyte]

A nonaqueous electrolyte in accordance with an embodiment of the present invention is a nonaqueous electrolyte generally used for a nonaqueous electrolyte secondary battery, and is not limited to any specific one. Examples of the nonaqueous electrolyte include a nonaqueous electrolyte prepared by dissolving a lithium salt in an organic solvent. Examples of the lithium salt encompass $LiClO_4$, $LiPF_6$, $LiAsF_6$, $LiSbF_6$, $LiBF_4$, $LiCF_3SO_3$, $LiN(CF_3SO_2)_2$, $LiC(CF_3SO_2)_3$, $Li_2B_{10}Cl_{10}$, lower aliphatic carboxylic acid lithium salt, and $LiAlCl_4$. It is possible to use only one kind of the above lithium salts or two or more kinds of the above lithium salts in combination. It is preferable to use, among the above lithium salts, at least one fluorine-containing lithium salt selected from the group consisting of $LiPF_6$, $LiAsF_6$, $LiSbF_6$, $LiBF_4$, $LiCF_3SO_3$, $LiN(CF_3SO_2)_2$, and $LiC(CF_3SO_2)_3$.

Specific examples of the organic solvent in the nonaqueous electrolyte in accordance with an embodiment of the present invention include carbonates such as ethylene carbonate, propylene carbonate, dimethyl carbonate, diethyl carbonate, ethyl methyl carbonate, 4-trifluoromethyl-1,3-dioxolane-2-on, and 1,2-di(methoxy carbonyloxy)ethane; ethers such as 1,2-dimethoxyethane, 1,3-dimethoxypropane, pentafluoropropyl methylether, 2,2,3,3-tetrafluoropropyl difluoro methylether, tetrahydrofuran, and 2-methyl tetrahydrofuran; esters such as methyl formate, methyl acetate, and γ-butyrolactone; nitriles such as acetonitrile and butyronitrile; amides such as N,N-dimethylformamide and N,N-dimethylacetamide; carbamates such as 3-methyl-2-oxazolidone; sulfur-containing compounds such as sulfolane, dimethyl sulfoxide, and 1,3-propane sultone; and fluorine-containing organic solvents each prepared by introducing a fluorine group into the organic solvents described above. It is possible to use only one kind of the above organic solvents or two or more kinds of the above organic solvents in combination.

Among the above organic solvents, carbonates are preferable. A mixed solvent of a cyclic carbonate and an acyclic carbonate or a mixed solvent of a cyclic carbonate and an ether is further preferable. The mixed solvent of a cyclic carbonate and an acyclic carbonate is further preferably a mixed solvent of ethylene carbonate, dimethyl carbonate, and ethyl methyl carbonate because such a mixed solvent allows a wider operating temperature range, and is not easily decomposed even in a case where a graphite material such as natural graphite or artificial graphite is used as a negative electrode active material.

[Method of Producing Nonaqueous Electrolyte Secondary Battery]

A nonaqueous electrolyte secondary battery in accordance with an embodiment of the present invention can be produced by, for example, (i) forming a nonaqueous electrolyte secondary battery member in which the positive electrode plate, a nonaqueous electrolyte secondary battery separator including the aforementioned porous film, and the negative electrode are arranged in this order, (ii) inserting the nonaqueous electrolyte secondary battery member into a container for use as a housing of the nonaqueous electrolyte secondary battery, (iii) filling the container with a nonaqueous electrolyte, and (iv) hermetically sealing the container under reduced pressure. A nonaqueous electrolyte secondary battery in accordance with an embodiment of the present invention may have any shape such as the shape of a thin plate (sheet), a disk, a cylinder, or a prism such as a cuboid. The method of producing the nonaqueous electrolyte secondary battery is not limited to any particular one, and can be any conventionally known method.

Embodiment 2: Nonaqueous Electrolyte Secondary Battery Member

A nonaqueous electrolyte secondary battery member in accordance with Embodiment 2 of the present invention is a nonaqueous electrolyte secondary battery member including: a positive electrode plate; a nonaqueous electrolyte secondary battery separator containing a polyolefin porous film; and a negative electrode plate, wherein the polyolefin porous film has a puncture strength of equal to or greater than 26.0 $gf/g/m^2$, which puncture strength is measured with respect to a weight per unit area of the polyolefin porous film, and wherein the polyolefin porous film has a value in a range of 0.00 to 0.54, the positive electrode plate has a value in a range of 0.00 to 0.50, and the negative electrode plate has a value in a range of 0.00 to 0.50, where each of the values is represented by the following Formula (1):

$$|1-T/M| \qquad (1)$$

where T represents a critical load distance in a traverse direction in a scratch test under a constant load of 0.1 N, and M represents a critical load distance in a machine direction in a scratch test under a constant load of 0.1 N.

The positive electrode plate, the negative electrode plate, and the nonaqueous electrolyte secondary battery separator containing a polyolefin porous film all of which are constituent members of the nonaqueous electrolyte secondary battery member in accordance with Embodiment 2 of the present invention are identical to the positive electrode plate, the negative electrode plate, and the nonaqueous electrolyte secondary battery separator containing a polyolefin porous film all of which are constituent members of the nonaqueous electrolyte secondary battery in accordance with Embodiment 1 of the present invention, respectively.

A nonaqueous electrolyte secondary battery member in accordance with an embodiment of the present invention can be produced by, for example, arranging the positive electrode plate, the nonaqueous electrolyte secondary battery separator described above, and the negative plate in this order.

A nonaqueous electrolyte secondary battery member in accordance with an embodiment of the present invention includes: a positive electrode plate having a value in a range of 0.00 to 0.50, which value is represented by the Formula (1) described above, a nonaqueous electrolyte secondary battery separator constituted by a porous film, the porous film having a puncture strength of equal to or greater than 26.0 $gf/g/m^2$, which puncture strength is measured with respect to a weight per unit area of the porous film, the porous film having a value in a range of 0.00 to 0.54, which value is represented by the Formula (1) described above; and a negative electrode plate having a value in a range of 0.00 to 0.50, which value is represented by the Formula (1) described above, the positive electrode plate, the a nonaqueous electrolyte secondary battery separator, and the negative electrode plate being arranged in this order. Thus, a nonaqueous electrolyte secondary battery member in accordance with an embodiment of the present invention allows a nonaqueous electrolyte secondary battery into which the nonaqueous electrolyte secondary battery member is incorporated to further increase a rate characteristic maintaining ratio after a charge-discharge cycle and further increase battery characteristics such as an initial rate characteristic.

The present invention is not limited to the embodiments, but can be altered by a skilled person in the art within the scope of the claims. The present invention also encompasses, in its technical scope, any embodiment derived by combining technical means disclosed in differing embodiments. Further, it is possible to form a new technical feature by combining the technical means disclosed in the respective embodiments.

EXAMPLES

The following description will discuss embodiments of the present invention in greater detail with reference to Examples and Comparative Examples. Note, however, that the present invention is not limited to the following Examples.

[Measurements]

In each of Examples and Comparative Examples below, (i) respective physical property values of a nonaqueous electrolyte secondary battery separator, a positive electrode plate, and a negative electrode plate, (ii) a critical load value of a nonaqueous electrolyte secondary battery separator, (iii) a ratio of a critical load distance in a traverse direction to a critical load distance in a machine direction (T/M) of the nonaqueous electrolyte secondary battery separator, and (iv) a cycle characteristic of a nonaqueous electrolyte secondary battery, were measured by the following methods.

(Measurement of Film Thickness)

A film thickness of a nonaqueous electrolyte secondary battery separator obtained in each of Examples and Comparative Examples below and thicknesses of a positive electrode plate and a negative electrode plate both of which are obtained in each of Examples and Comparative Examples below, were measured with use of a high-precision digital measuring device (VL-50) manufactured by Mitutoyo Corporation.

(Weight Per Unit Area of Porous Film)

A sample in the form of an 8 cm square was cut out from each of the polyolefin porous films produced in Examples and Comparative Examples below, and the weight W(g) of the sample was measured. Then, the weight per unit area of the polyolefin porous film was calculated in accordance with the following Formula:

Weight per unit area $(g/m^2) = W/(0.08 \times 0.08)$ (Average Particle Diameters of Positive Electrode Active Material and Negative Electrode Active Material)

As to a positive electrode active material used to prepare a positive electrode plate and a negative electrode active material used to prepare a negative electrode plate in each of Examples and Comparative Examples below, respective particle size distributions based on a volume and respective average particle diameters (D50) were measured with use of a laser diffraction particle size analyzer (manufactured by Shimazu Corporation; product name: SALD2200).

(Measurement of Porosity of Positive Electrode Mix Layer)

A porosity of a positive electrode mix layer included in a positive electrode plate in each of the Examples was measured by the following method.

A positive electrode plate prepared by applying a layer of a positive electrode mix (a mixture of $LiNi_{0.5}Mn_{0.3}Co_{0.2}O_2$, an electrically conductive agent, and PVDF (at a weight ratio of 92:5:3)) on one surface of a positive electrode current collector (aluminum foil) was cut into a piece having a size of 14.5 cm² (4.5 cm×3 cm+1 cm×1 cm). The cut piece of the positive electrode plate had a mass of 0.215 g and had a thickness of 58 µm. The positive electrode current collector was cut into a piece having the same size as the cut piece of the positive electrode plate. The cut piece of the positive electrode current collector had a mass of 0.078 g and had a thickness of 20 µm.

A density ρ of the positive electrode mix layer was calculated as $(0.215-0.078)/\{(58-20)/10000 \times 14.5\} = 2.5$ g/cm³.

Each of the materials contained in the positive electrode mix had a real density as follows: $LiNi_{0.5}Mn_{0.3}Co_{0.2}O_2$, an electrically conductive agent, and PVDF had real densities of 4.68 g/cm³, 1.8 g/cm³, and 1.8 g/cm³, respectively.

The positive electrode mix layer had a porosity °ε of 40%, which was determined by calculation from the above values by the following formula:

$°ε = [1-\{2.5 \times (92/100)/4.68 + 2.5 \times (5/100)/1.8 + 2.5 \times (3/100)/1.8\}] \times 100 = 40\%$ (Measurement of Porosity of Negative Electrode Mix Layer)

A porosity of a negative electrode mix layer included in a negative electrode plate in each of the Examples was measured by the following method.

A negative electrode plate prepared by applying a layer of a negative electrode mix (a mixture of graphite, styrene-1,3-butadiene copolymer, and sodium carboxymethyl cellulose (at a weight ratio of 98:1:1)) on one surface of a negative electrode current collector (copper foil) was cut into a piece having a size of 18.5 cm² (5 cm×3.5 cm+1 cm×1 cm). The cut piece of the negative electrode plate had a mass of 0.266 g and had a thickness of 48 µm. The negative electrode current collector was cut into a piece having the same size as the cut piece of the negative electrode plate. The cut piece of the negative electrode current collector had a mass of 0.162 g and had a thickness of 10 µm.

A density ρ of the negative electrode mix layer was calculated as $(0.266-0.162)/\{(48-10)/10000 \times 18.5\} = 1.49$ g/cm³.

Each of the materials contained in the negative electrode mix had a real density as follows: graphite, styrene-1,3-butadiene copolymer, and sodium carboxymethyl cellulose had real densities of 2.2 g/cm³, 1 g/cm³, and 1.6 g/cm³, respectively.

The negative electrode mix layer had a porosity °ε of 31%, which was determined by calculation from the above values by the following formula:

$°ε = [1-\{1.49 \times (98/100)/2.2 + 1.49 \times (1/100)/1 + 1.49 \times (1/100)/1.6\}] \times 100 = 31\%$ (Scratch Test)

The critical load value and the ratio of a critical load distance in a traverse direction to a critical load distance in a machine direction (T/M) were measured by a scratch test (see FIG. 1). Any conditions and the like for the measurement other than the conditions described below are similar to those disclosed in JIS R 3255. In addition, a measurement apparatus used was a microscratch testing device (manufactured by CSEM Instruments).

(1) A porous film, a positive electrode plate, and a negative electrode plate (referred to as "measurement target object 3") in each of Examples and Comparative Examples were cut into a piece of 20 mm×60 mm. Then, a diluted glue solution which had been obtained by diluting Arabic Yamato aqueous liquid glue (manufactured by YAMATO Co., Ltd.) with water by a 5-fold dilution factor was applied to an entire surface of a glass preparation (substrate 2) of 30 mm×70 mm so that the weight per unit area of the diluted glue solution was approximately 1.5 g/m². The cut piece of the measurement target object 3 and the substrate 2 were bonded together with use of the diluted glue solution which had been applied to the substrate 2. Thereafter, a resulting laminated material was dried at a temperature of 25° C. for one whole day and night, so that a test sample was prepared. Note that the cut piece of the measurement target object 3 and the glass preparation (substrate 2) were to be bonded together with care so that no air bubble was made between the cut piece of the measurement target object 3 and the glass preparation. Note that in a case where the measurement target object 3 was an electrode plate (a positive electrode plate or a negative electrode plate), a resulting test sample was prepared in such a manner that a mix layer (a positive electrode mix layer or a negative electrode mix layer) of the electrode plate served as an upper surface of the test sample which upper surface was to contact a diamond indenter 1 (described later).

(2) The test sample prepared in the step (1) was placed on a microscratch testing device (manufactured by CSEM Instruments). Then, while the diamond indenter 1 (in a conical shape having an apex angle of 120° and having a tip whose radius was 0.2 mm) of the testing device was applying a vertical load of 0.1 N to the test sample, a table of the testing device was moved by a distance of 10 mm in a traverse direction (TD) of the measurement target object 3 at a speed of 5 mm/min. During the movement of the table, stress (force of friction) that occurred between the diamond indenter 1 and the test sample was measured.

(3) A line graph, which shows a relationship between a displacement of the stress measured in the step (2) and the distance of the movement of the table, was made. Then, based on the line graph, the following were calculated: (i) a critical load value in the traverse direction (TD) and (ii) a distance (critical load distance) in the traverse direction between a starting point of measurement and a point where the critical load was obtained.

(4) The direction of the movement of the table was changed to a machine direction (MD), and the above steps (1) through (3) were repeated. Then, the following were calculated: (i) a critical load value in the machine direction and (ii) the distance (critical load distance) in the machine direction between a starting point of measurement and a point where the critical load was obtained.

(Cycle Test)

(A) Initial Charge and Discharge

A new nonaqueous electrolyte secondary battery which had been produced in each of Examples and Comparative Examples and which had not been subjected to any charge-discharge cycle was subjected to four cycles of initial charge and discharge. Each of the four cycles of the initial charge and discharge was carried out at 25° C., at a voltage ranging from 4.1 V to 2.7 V, and at an electric current value of 0.2 C. More specifically, each of the four initial charge-discharge cycles was carried out (i) at a voltage ranging from 2.7 V to 4.1 V, (ii) with CC-CV charge under conditions where a charge current value was 0.2 C, and a terminal current condition was 0.02 C, and (iii) with CC discharge at a discharge current value of 0.2 C. Here, note that the "1 C" means an electric current value at which a battery rated capacity derived from a one-hour rate discharge capacity is discharged in one hour. Note also that the "CC-CV charge" is a charging method in which (i) a battery is charged at a constant electric current set, (ii) after a certain voltage is reached, the certain voltage is maintained while the electric current is being reduced. Note also that the "CC discharge" is a discharging method in which a battery is discharged at a constant electric current until a certain voltage is reached. The "1 C", "CC-CV charge", and "CC discharge" in the following descriptions also have the same meanings as those described above.

(B) Rate Characteristic Maintaining Ratio (%)

Subsequently, an initial battery characteristic maintaining ratio at 55° C. was calculated according to the following Formula (4):

$$\text{Initial battery characteristic maintaining ratio (\%)} = \text{(discharge capacity at 20 C/discharge capacity at 0.2 C)} \times 100 \quad (4)$$

Subsequently, the nonaqueous electrolyte secondary battery was subjected to 100 cycles of charge and discharge, with each cycle being performed at a temperature of 55° C., a constant charge electric current value of 1 C, and a constant discharge electric current value of 10 C.

More specifically, each of the 100 charge-discharge cycles was carried out (i) at 55° C., (ii) at a voltage ranging from 2.7 V to 4.2 V, (iii) with CC-CV charge under conditions where a charge current value was 1 C, and a terminal current condition was 0.02 C, and (iv) with CC discharge at a discharge current value of 10 C.

Then, a rate characteristic maintaining ratio after 100 cycles was calculated according to the following Formula (5):

$$\text{Rate characteristic maintaining ratio (\%)} = \text{(discharge capacity at 20 C at 100th cycle/discharge capacity at 0.2 C at 100th cycle)} \times 100 \quad (5)$$

More specifically, a nonaqueous electrolyte secondary battery which had been subjected to the 100 charge-discharge cycles was subjected to charge and discharge in which each charge-discharge cycle was carried out (i) at 55° C., (ii) at a voltage ranging from 2.7 V to 4.2 V, (iii) with CC-CV charge under conditions where a charge current value was 1 C, and a terminal current condition was 0.02 C, and (iv) with CC discharge. Here, the CC discharge was carried out with changes in discharge current value at 3-cycle intervals to 0.2 C, 1 C, 5 C, 10 C, and 20 C in this order. That is, the discharge current value was changed to 0.2 C, 1 C, 5 C, 10 C, and 20 C in this order. Three cycles of charge and discharge were carried out for each rate.

A discharge capacity in the third cycle of the charge and discharge in which the discharge current value was 0.2 C and a discharge capacity in the third cycle of the charge and discharge in which the discharge current value was 20 C were measured and designated as "discharge capacity at 0.2 C at 100th cycle" and "discharge capacity at 20 C at 100th cycle", respectively. From obtained values of the "discharge capacity at 0.2 C at 100th cycle" and of the "discharge capacity at 20 C at 100th cycle", a rate characteristic maintaining ratio after 100 cycles was calculated according to the Formula (5).

(C) High-Rate Discharge Capacity (mAh/g)

A nonaqueous electrolyte secondary battery which had been subjected to the initial charge and discharge was subjected to charge and discharge in which each charge-discharge cycle was carried out (i) at 55° C., (ii) at a voltage ranging from 2.7 V to 4.2 V, (iii) with CC-CV charge under conditions where a charge current value was 1 C, and a terminal current condition was 0.02 C, and (iv) with CC discharge. Here, the CC discharge was carried out with changes in discharge current value at 3-cycle intervals to 0.2 C, 1 C, and 2 C in this order. That is, the discharge current value was changed to 0.2 C, 1 C, and 2 C in this order. Three cycles of charge and discharge were carried out for each rate.

At this time, a discharge capacity in the third cycle in which the discharge current value was 2 C was measured, and the discharge capacity thus measured was divided by a mass of a positive electrode active material to determine a high-rate discharge capacity (unit: mAh/g).

(Measurement of Puncture Strength with Respect to Weight Per Unit Area)

A porous film was fixed with a washer of 12 mmφ by use of a handy-type compression tester (KATO TECH CO., LTD.; model No. KES-G5). Piercing strength (unit: $gf/g/m^2$) of the porous film with respect to a weight per unit area of the porous film was defined as a maximum stress (gf) obtained by puncturing the porous film with a pin at 200 mm/min. The pin used in the measurement had a pin diameter of 1 mmφ and a tip radius of 0.5 R.

Example 1

<Production of Nonaqueous Electrolyte Secondary Battery Separator>

Ultra-high molecular weight polyethylene powder (GUR4032, manufactured by Ticona Corporation) and polyethylene wax (FNP-0115, manufactured by Nippon Seiro Co., Ltd.) having a weight-average molecular weight of 1000 were mixed at a ratio of 72% by weight:29% by weight. Then, to 100 parts by weight of a mixture of the ultra-high molecular weight polyethylene and the polyethylene wax, the following were added: 0.4 parts by weight of antioxidant (Irg1010, manufactured by Ciba Specialty Chemicals Inc.), 0.1 parts by weight of antioxidant (P168, manufactured by Ciba Specialty Chemicals Inc.), and 1.3 parts by weight of sodium stearate. Then, calcium carbonate (manufactured by Maruo Calcium Co., Ltd.) having an average pore size of 0.1 μm was further added so as to account for 37% by volume of a total volume of the resultant mixture. Then, the resultant mixture while remaining a powder was mixed with the use of a Henschel mixer, so that a mixture A was obtained. Then, the mixture A was melted and kneaded with the use of a twin screw kneading extruder, so that a polyolefin resin composition A was obtained. Then, the polyolefin resin composition A was rolled with the use of a roller at a circumferential velocity of 4.0 m/min, so that a rolled sheet A was obtained. Then, the rolled sheet A was immersed in a hydrochloric acid aqueous solution (containing 4 mol/L of hydrochloric acid and 0.5% by weight of a nonionic surfactant) so as to remove the calcium carbonate from the rolled sheet A. Then, the resultant sheet A was stretched with a stretch magnification of 7.0 times (ratio of the stretch temperature to the stretch magnification=14.3) at 100° C. Furthermore, the resultant sheet was heat fixed at 123° C. so that a porous film A was obtained. The weight per unit area of the porous film A thus obtained was 5.4 $g/m^2$. The porous film A was designated as a nonaqueous electrolyte secondary battery separator A.

<Preparation of Nonaqueous Electrolyte Secondary Battery>

(Positive Electrode Plate)

A positive electrode plate was obtained in which a layer of a positive electrode mix (a mixture of $LiNi_{0.5}Mn_{0.3}Co_{0.2}O_2$ having an average particle diameter (D50) of 4.5 μm based on a volume, an electrically conductive agent, and PVDF (at a weight ratio of 92:5:3)) was applied on one surface of a positive electrode current collector (aluminum foil). In the positive electrode plate thus obtained, a positive electrode mix layer had a porosity of 40%.

The positive electrode plate was partially cut off so that a positive electrode active material layer was present in an area of 45 mm×30 mm and that this area was surrounded by an area with a width of 13 mm in which area no positive electrode active material layer was present. A portion thus cut was used as a positive electrode plate 1.

(Negative Electrode Plate)

A negative electrode plate was obtained in which a layer of a negative electrode mix (a mixture of graphite having an average particle diameter (D50) of 15 μm based on a volume, styrene-1,3-butadiene copolymer, and sodium carboxymethyl cellulose (at a weight ratio of 98:1:1)) was applied on one surface of a negative electrode current collector (copper foil). In the negative electrode plate thus obtained, a negative electrode mix layer had a porosity of 31%.

The negative electrode plate was partially cut off so that a negative electrode active material layer was present in an area of 50 mm×35 mm and that this area was surrounded by an area with a width of 13 mm in which area no negative electrode active material layer was present. A portion thus cut was used as a negative electrode plate 1.

(Preparation of Nonaqueous Electrolyte Secondary Battery)

In a laminate pouch, the positive electrode plate, the porous film A (electrolyte secondary battery separator A), and the negative electrode plate were disposed (arranged) in this order so as to obtain a nonaqueous electrolyte secondary battery member 1. In so doing, the positive electrode plate and the negative electrode plate were arranged so that a main surface of the positive electrode mix layer of the positive electrode plate was entirely covered by a main surface of the negative electrode mix layer of the negative electrode plate (i.e., the main surface of the positive electrode mix layer of the positive electrode plate overlapped the main surface of the negative electrode mix layer of the negative electrode plate).

Subsequently, the nonaqueous electrolyte secondary battery member was put into a bag made of a laminate of an aluminum layer and a heat seal layer. Further, 0.25 mL of nonaqueous electrolyte was put into the bag. The above nonaqueous electrolyte was prepared by dissolving $LiPF_6$ in a mixed solvent of ethylene carbonate, ethyl methyl carbonate, and diethyl carbonate at a ratio of 3:5:2 (volume ratio) so that the $LiPF_6$ would be contained at 1 mol/L. The bag was then heat-sealed while the pressure inside the bag was reduced. This produced a nonaqueous electrolyte secondary battery A.

Example 2

A polyolefin resin composition 2 was obtained as in Example 1 except that (i) ultra-high molecular weight polyethylene powder (GUR4032, manufactured by Ticona Corporation) was used in an amount of 70% by weight, (ii)

polyethylene wax (FNP-0115, manufactured by Nippon Seiro Co., Ltd.) having a weight-average molecular weight of 1000 was used in an amount of 30% by weight, and (iii) calcium carbonate (manufactured by Maruo Calcium Co., Ltd.) having an average pore size of 0.1 μm was used so as to account for 36% by volume of a total volume of the resultant mixture. Then, the polyolefin resin composition 2 was rolled with the use of a roller at a circumferential velocity of 3.0 m/min, so that a rolled sheet B was prepared. Then, the rolled sheet B was subjected to removal of the calcium carbonate, stretching, and heat fixing as in Example 1 except that (i) the stretch temperature was set to 105° C., (ii) the stretch magnification was set to 6.2 times (ratio of the stretch temperature to the stretch magnification=16.9), and (iii) the heat fixing temperature was set to 120° C., so that a porous film B was obtained. The weight per unit area of the porous film B thus obtained was 6.9 g/m². The porous film B thus obtained was designated as a nonaqueous electrolyte secondary battery separator B.

A nonaqueous electrolyte secondary battery B was prepared by a method similar to that used in Example 1 except that the porous film B was used instead of the porous film A.

Example 3

Figure 3:
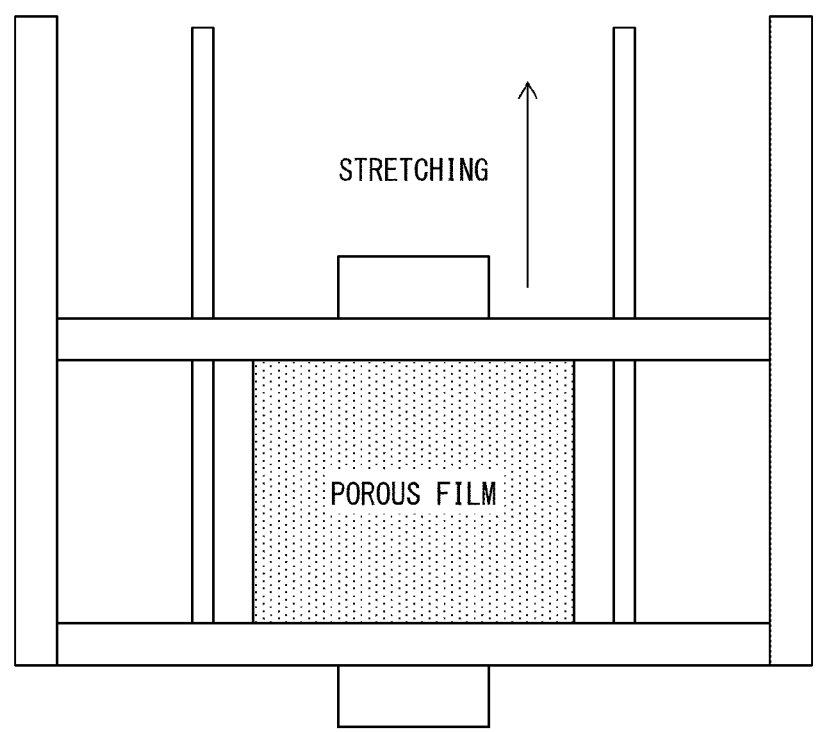
FIG. 3 is a view schematically illustrating a method of additionally stretching a stretched film after the stretched film is heat fixed and cooled in each of Examples 3 through 5.

A piece of 5 cm×5 cm was cut out from the porous film A obtained in Example 1. Then, the piece of the porous film A was fixed, with the use of a tape, to an SUS (stainless steel) jig in the shape of 15 cm×15 cm frame as illustrated in FIG. 3. Then, with the use of a compact desktop tester (EZ-L, manufactured by Shimadzu Corporation) on which a thermostat bath was placed, the piece of the porous film A was additionally stretched at 85° C. so that the length in the machine direction would be 1.5 times as long. This produced a porous film C. Note that FIG. 3 is a view schematically illustrating a compact desktop tester with a porous film fixed thereto, when observed in a state in which a longitudinal direction of the compact desktop tester coincides with the machine direction of the porous film, and a lateral direction of the compact desktop tester coincides with the transverse direction of the porous film. By a method similar to that used in Example 3, an additional stretch of a porous film fixed to a compact desktop tester was also performed in Examples 4 and 5 below.

The porous film C was designated as a nonaqueous electrolyte secondary battery separator C.

A nonaqueous electrolyte secondary battery C was prepared by a method similar to that used in Example 1 except that the porous film C was used instead of the porous film A.

Example 4

A piece of 5 cm×5 cm was cut out from the porous film A obtained in Example 1. Then, the piece of the porous film A was fixed, with the use of a tape, to an SUS (stainless steel) jig in the shape of 15 cm×15 cm frame as illustrated in FIG. 3. Then, with the use of a compact desktop tester (EZ-L, manufactured by Shimadzu Corporation) on which a thermostat bath was placed, the piece of the porous film A was additionally stretched at 85° C. so that the length in the machine direction would be 1.2 times as long. This produced a porous film D.

The porous film D was designated as a nonaqueous electrolyte secondary battery separator D.

A nonaqueous electrolyte secondary battery D was prepared by a method similar to that used in Example 1 except that the porous film D was used instead of the porous film A.

Comparative Example 1

Ultra-high molecular weight polyethylene powder (GUR2024, manufactured by Ticona Corporation and polyethylene wax (FNP-0115, manufactured by Nippon Seiro Co., Ltd.) having a weight-average molecular weight of 1000 were mixed at a ratio of 68% by weight:32% by weight. Then, to 100 parts by weight of a mixture of the ultra-high molecular weight polyethylene and the polyethylene wax, the following were added: 0.4 parts by weight of antioxidant (Irg1010, manufactured by Ciba Specialty Chemicals Inc.), 0.1 parts by weight of antioxidant (P168, manufactured by Ciba Specialty Chemicals Inc.), and 1.3 parts by weight of sodium stearate. Then, calcium carbonate (manufactured by Maruo Calcium Co., Ltd.) having an average pore size of 0.1 μm was further added so as to account for 38% by volume of a total volume of the resultant mixture. Then, the resultant mixture while remaining a powder was mixed with the use of a Henschel mixer, so that a mixture E was obtained. Thereafter, the mixture E was melted and kneaded with the use of a twin screw kneading extruder, so that a polyolefin resin composition E was obtained. Then, a polyolefin resin composition E was rolled with the use of a roller at a circumferential velocity of 2.5 m/min, so that a rolled sheet E was prepared. Thereafter, the rolled sheet E was immersed in a hydrochloric acid aqueous solution (containing 4 mol/L of hydrochloric acid and 0.5% by weight of a nonionic surfactant) so as to remove the calcium carbonate from the rolled sheet E. Then, the resultant sheet E was stretched with a stretch magnification of 6.2 times (ratio of the stretch temperature to the stretch magnification=16.1) at 100° C. Furthermore, the resultant sheet was heat fixed at 126° C. so that a porous film E was obtained. The weight per unit area of the porous film E thus obtained was 6.4 g/m². The porous film E was designated as a nonaqueous electrolyte secondary battery separator E.

A nonaqueous electrolyte secondary battery E was prepared by a method similar to that used in Example 1 except that the porous film E was used instead of the porous film A.

Example 5

A piece of 5 cm×5 cm was cut out from the porous film E obtained in Comparative Example 1. Then, the piece of the porous film E was fixed, with the use of a tape, to an SUS (stainless steel) jig in the shape of 15 cm×15 cm frame as illustrated in FIG. 3. Then, with the use of a compact desktop tester (EZ-L, manufactured by Shimadzu Corporation) on which a thermostat bath was placed, the piece of the porous film E was additionally stretched at 85° C. so that the length in the machine direction would be 1.5 times as long. This produced a porous film F.

The porous film F was designated as a nonaqueous electrolyte secondary battery separator F.

A nonaqueous electrolyte secondary battery F was prepared by a method similar to that used in Example 1 except that the porous film F was used instead of the porous film A.

Comparative Example 2

A commercially available polyolefin separator (weight per unit area: 13.9 g/m²) was designated as a porous film G (nonaqueous electrolyte secondary battery separator G).

A nonaqueous electrolyte secondary battery G was prepared by a method similar to that used in Example 1 except that the porous film G was used instead of the porous film A.

Example 6

(Positive Electrode Plate)

A positive electrode plate 2 was obtained as in Example 1 except that the positive electrode mix was changed to a mixture of $LiCoO_2$ having an average particle diameter (D50) of 5 μm based on a volume, an electrically conductive agent, and PVDF (at a weight ratio of 97:1.8:1.2). In the positive electrode plate 2 thus obtained, a positive electrode active material layer had a porosity of 20%.

(Negative Electrode Plate)

A negative electrode plate 2 was obtained as in Example 1 except that the negative electrode mix was changed to a mixture of artificial graphite having an average particle diameter (D50) of 20 μm based on a volume, styrene-1,3-butadiene copolymer, and sodium carboxymethyl cellulose (at a weight ratio of 98:1:1). In the negative electrode plate 2 thus obtained, a negative electrode active material layer had a porosity of 35%.

(Preparation of Nonaqueous Electrolyte Secondary Battery)

A nonaqueous electrolyte secondary battery H was prepared as in Example 1 except that the positive electrode plate 2 was used as a positive electrode plate, and the negative electrode plate 2 was used as a negative electrode plate.

Example 7

(Positive Electrode Plate)

A positive electrode plate 3 was obtained as in Example 1 except that the positive electrode mix was changed to a mixture of $LiNi_{0.33}Mn_{0.33}Co_{0.33}O_2$ having an average particle diameter (D50) of 10 μm based on a volume, an electrically conductive agent, and PVDF (at a weight ratio of 100:5:3). In the positive electrode plate 3 thus obtained, a positive electrode active material layer had a porosity of 34%.

(Preparation of Nonaqueous Electrolyte Secondary Battery)

A nonaqueous electrolyte secondary battery I was prepared as in Example 1 except that the positive electrode plate 3 was used as a positive electrode plate.

Example 8

(Preparation of Nonaqueous Electrolyte Secondary Battery)

A nonaqueous electrolyte secondary battery J was prepared as in Example 1 except that the negative electrode plate 2 was used as a negative electrode plate.

Comparative Example 3

(Positive Electrode Plate)

A positive electrode plate 4 was obtained as in Example 1 except that the positive electrode mix was changed to a mixture of $LiMn_2O_4$ having an average particle diameter (D50) of 8 μm based on a volume, an electrically conductive agent, and PVDF (at a weight ratio of 100:5:3). In the positive electrode plate 4 thus obtained, a positive electrode active material layer had a porosity of 51%.

(Preparation of Nonaqueous Electrolyte Secondary Battery)

A nonaqueous electrolyte secondary battery K was prepared as in Example 1 except that the positive electrode plate 4 was used as a positive electrode plate.

Comparative Example 4

(Negative Electrode Plate)

A negative electrode plate 3 was obtained as in Example 1 except that the negative electrode mix was changed to a mixture of artificial spherocrystal graphite having an average particle diameter (D50) of 34 μm based on a volume, an electrically conductive agent, and PVDF (at a weight ratio of 85:15:7.5). In the negative electrode plate 3 thus obtained, a negative electrode mix layer had a porosity of 34%.

(Preparation of Nonaqueous Electrolyte Secondary Battery)

A nonaqueous electrolyte secondary battery L was prepared as in Example 1 except that the negative electrode plate 3 was used as a negative electrode plate.

Table 1 below shows the circumferential velocities, the stretch temperatures, the stretch magnifications, and ratios of the stretch temperatures to the corresponding stretch magnifications of the reduction rollers used in Examples 1 and 2 and Comparative Example 1.

TABLE 1

| | Circumferential velocity of reduction roller [m/min] | Stretch temperature [° C.] | Stretch magnification [%] | Stretch temperature/ stretch magnification [° C./times] |
|---|---|---|---|---|
| Example 1 | 4.0 | 100 | 700 | 14.3 |
| Example 2 | 3.0 | 105 | 620 | 16.9 |
| Comparative Example 1 | 2.5 | 100 | 620 | 16.1 |

[Measurement Results]

Each of the positive electrode plates 1 through 4 and the negative electrode plates 1 through 3, which had been obtained in Examples 1 through 8 and Comparative Examples 1 through 4, was subjected to the scratch test so as to measure (i) respective "critical loads" in a traverse direction and in a machine direction and (ii) respective "critical load distances" in the traverse direction and in the machine direction. The results are shown in Table 2.

TABLE 2

| Electrode plate | Scratching direction | Critical load [N] | Distance to critical load (critical point) (critical load distance) [mm] | |1-TD/MD| |
|---|---|---|---|---|
| Positive electrode plate 1 | MD | 0.21 | 2.85 | 0.33 |
| | TD | 0.19 | 1.91 | |
| Positive electrode plate 2 | MD | 0.20 | 2.90 | 0.47 |
| | TD | 0.18 | 1.55 | |
| Positive electrode plate 3 | MD | 0.21 | 2.24 | 0.04 |
| | TD | 0.19 | 2.14 | |
| Positive electrode plate 4 | MD | 0.24 | 3.58 | 0.54 |
| | TD | 0.19 | 1.65 | |
| Negative electrode plate 1 | MD | 0.22 | 2.18 | 0.10 |
| | TD | 0.20 | 1.97 | |

TABLE 2-continued

| Electrode plate | Scratching direction | Critical load [N] | Distance to critical load (critical point) (critical load distance) [mm] | \|1-TD/MD\| |
|---|---|---|---|---|
| Negative electrode plate 2 | MD | 0.21 | 3.25 | 0.49 |
| | TD | 0.18 | 1.65 | |
| Negative electrode plate 3 | MD | 0.23 | 3.94 | 0.53 |
| | TD | 0.19 | 1.85 | |

Further, each of the nonaqueous electrolyte secondary battery separators A through G, which had been obtained in Examples 1 through 8 and Comparative Examples 1 and 4, was subjected to the scratch test so as to measure (i) respective "critical loads" in a traverse direction and in a machine direction and (ii) respective "critical load distances" in the traverse direction and in the machine direction. The results are shown in Table 3.

TABLE 3

| Nonaqueous electrolyte secondary battery separator | Puncture strength with respect to volume per unit area [gf/g/m$^2$] | Scratching direction | Critical load [N] | Distance to critical load (critical point) (critical load distance) [mm] | \|1-TD/MD\| |
|---|---|---|---|---|---|
| Nonaqueous electrolyte secondary battery separator A | 64.1 | MD | 0.23 | 3.82 | 0.37 |
| | | TD | 0.19 | 2.42 | |
| Nonaqueous electrolyte secondary battery separator B | 52.5 | MD | 0.18 | 4.84 | 0.42 |
| | | TD | 0.21 | 2.83 | |
| Nonaqueous electrolyte secondary battery separator C | 53.5 | MD | 0.21 | 2.60 | 0.23 |
| | | TD | 0.19 | 2.00 | |
| Nonaqueous electrolyte secondary battery separator D | 57.2 | MD | 0.22 | 3.54 | 0.46 |
| | | TD | 0.21 | 1.92 | |
| Nonaqueous electrolyte secondary battery separator E | 67.0 | MD | 0.20 | 4.53 | 0.55 |
| | | TD | 0.19 | 2.06 | |
| Nonaqueous electrolyte secondary battery separator F | 63.4 | MD | 0.22 | 2.59 | 0.31 |
| | | TD | 0.20 | 1.78 | |
| Nonaqueous electrolyte secondary battery separator G | 25.0 | MD | 0.24 | 4.18 | 0.57 |
| | | TD | 0.19 | 1.80 | |

Further, a rate characteristic maintaining ratio after 100 cycles, which ratio indicates a cycle characteristic of each of the nonaqueous electrolyte secondary batteries A through G obtained in Examples 1 through 5 and Comparative Examples 1 and 2, was measured. In addition, a high-rate discharge capacity, which indicates an initial rate characteristic of each of the nonaqueous electrolyte secondary batteries A, B, and H through L obtained in Examples 1, 2, and 6 through 8 and Comparative Examples 3 and 4, was measured by the above-described method. The results are shown in Table 4.

TABLE 4

| | Positive electrode plate | Negative electrode plate | Nonaqueous electrolyte secondary battery separator | Rate characteristic maintaining ratio after 100 cycles [%] | High-rate discharge capacity [mAh/g] |
|---|---|---|---|---|---|
| Ex. 1 | Positive electrode plate 1 | Negative electrode plate 1 | Nonaqueous electrolyte secondary battery separator A | 53 | 146 |
| Ex. 2 | Positive electrode plate 1 | Negative electrode plate 1 | Nonaqueous electrolyte secondary battery separator B | 50 | 148 |
| Ex. 3 | Positive electrode plate 1 | Negative electrode plate 1 | Nonaqueous electrolyte secondary battery separator C | 64 | — |
| Ex. 4 | Positive electrode plate 1 | Negative electrode plate 1 | Nonaqueous electrolyte secondary battery separator D | 44 | — |
| Ex. 5 | Positive electrode plate 1 | Negative electrode plate 1 | Nonaqueous electrolyte secondary battery separator F | 59 | — |
| Ex. 6 | Positive electrode plate 2 | Negative electrode plate 2 | Nonaqueous electrolyte secondary battery separator A | — | 136 |
| Ex. 7 | Positive electrode plate 3 | Negative electrode plate 1 | Nonaqueous electrolyte secondary battery separator A | — | 124 |
| Ex. 8 | Positive electrode plate 1 | Negative electrode plate 2 | Nonaqueous electrolyte secondary battery separator A | — | 156 |
| Com. Ex. 1 | Positive electrode plate 1 | Negative electrode plate 1 | Nonaqueous electrolyte secondary battery separator E | 38 | — |
| Com. Ex. 2 | Positive electrode plate 1 | Negative electrode plate 1 | Nonaqueous electrolyte secondary battery separator G | 20 | — |
| Com. Ex. 3 | Positive electrode plate 4 | Negative electrode plate 1 | Nonaqueous electrolyte secondary battery separator A | — | 27 |

TABLE 4-continued

|  | Positive electrode plate | Negative electrode plate | Nonaqueous electrolyte secondary battery separator | Rate characteristic maintaining ratio after 100 cycles [%] | High-rate discharge capacity [mAh/g] |
|---|---|---|---|---|---|
| Com. Ex. 4 | Positive electrode plate 1 | Negative electrode plate 3 | Nonaqueous electrolyte secondary battery separator A | — | 116 |

Note:
In Table 4, Ex. is an abbreviation for "Example", and Com. Ex. is an abbreviation for "Comparative Example".

CONCLUSION

As shown in Tables 2 through 4, (i) according to each of the nonaqueous electrolyte secondary battery separators E and G produced in Comparative Examples 1 and 2, respectively, the value of "|1−T/M|" was greater than 0.54, that is, the value of "T/M" was less than 0.46, which means that critical load distances in scratch tests were highly anisotropic and (ii) the nonaqueous electrolyte secondary batteries E and G, which included the nonaqueous electrolyte secondary battery separators E and G, respectively, had such significantly low rate characteristics after 100 cycles (battery characteristic maintaining ratios) as 38% and 20%, respectively.

Meanwhile, (i) according to each of the nonaqueous electrolyte secondary battery separators A through D and F produced in Examples 1 through 5, respectively, the value of "|1−T/M|" was 0.00 to 0.54, that is, the value of "T/M" was 0.45 to 1.00, which means that critical load distances in scratch tests were slightly anisotropic and (ii) the nonaqueous secondary batteries A through D and F, which included the nonaqueous electrolyte secondary battery separators A through D and F, respectively, and each included the positive electrode plate having the value of "|1−T/M|" ranging from 0.00 to 0.50 and negative electrode plate having the value of "|1−T/M|" ranging from 0.00 to 0.50, each had a rate characteristic after 100 cycles (battery characteristic maintaining ratio) of equal to or greater than 44%. This confirmed that the nonaqueous secondary batteries A through D and F were superior in battery characteristics such as a cycle characteristic.

Further, according to (i) the positive electrode plate 4 produced in Comparative Example 3 and the negative electrode plate 3 produced in Comparative Example 4, respectively, the value of "|1−T/M|" was greater than 0.50, that is, the value of "T/M" was less than 0.50, which means that critical load distances in scratch tests were highly anisotropic, and (ii) the nonaqueous electrolyte secondary batteries K and L, which included the positive electrode plate 4 and the negative electrode plate 3, respectively, had high-rate discharge capacities of 27 mAh/g and 116 mAh/g, respectively. This confirmed that the high-rate discharge capacities of the nonaqueous electrolyte secondary batteries K and L were lower than those of the nonaqueous electrolyte secondary batteries A, B, and H through J, including the positive electrode plate and the negative electrode plate both of which had the value of "|1−T/M|" ranging from 0.00 to 0.50, that is, the value of "T/M" ranging from 0.50 to 1.00, which means that critical load distances in scratch tests were slightly anisotropic. That is, this confirmed that the nonaqueous electrolyte secondary batteries A, B, and H through J produced in Examples 1, 2, and 6 through 8, respectively, were excellent in initial rate characteristic.

INDUSTRIAL APPLICABILITY

A nonaqueous electrolyte secondary battery in accordance with an embodiment of the present invention is suitable for use as (i) a battery for use in devices such as a personal computer, a mobile telephone, and a portable information terminal and (ii) an on-vehicle battery.

REFERENCE SIGNS LIST

1: Diamond indenter
2: Substrate (glass preparation)
3: Measurement target object (porous film, positive electrode plate, or negative electrode plate)

The invention claimed is:

1. A nonaqueous electrolyte secondary battery comprising:
    a positive electrode plate;
    a nonaqueous electrolyte secondary battery separator containing a polyolefin porous film; and
    a negative electrode plate,
    wherein the polyolefin porous film contains a polyethylene having a weight-average molecular weight of $5 \times 10^5$ to $15 \times 10^6$ in an amount of not less than 68% by weight relative to the total weight of the polyolefin porous film,
    wherein the polyolefin porous film has a puncture strength of equal to or greater than 26.0 gf/g/m², which puncture strength is measured with respect to a weight per unit area of the polyolefin porous film, and
    wherein the polyolefin porous film has a value in a range of 0.00 to 0.54, the positive electrode plate has a value in a range of 0.00 to 0.50, and the negative electrode plate has a value in a range of 0.00 to 0.50, where each of the values is represented by the following Formula (1):

$$|1-T/M| \qquad (1)$$

where T represents a distance by which the polyolefin porous film, the positive electrode plate, or the negative electrode plate moves in a traverse direction from a starting point of measurement to a point where a critical load is obtained in a scratch test under a constant load of 0.1 N, and M represents a distance by which the polyolefin porous film, the positive electrode plate, or the negative electrode plate moves in a machine direction from a starting point of measurement to a point where a critical load is obtained in a scratch test under a constant load of 0.1 N.

2. The nonaqueous electrolyte secondary battery according to claim 1, wherein the positive electrode plate contains a transition metal oxide.

3. The nonaqueous electrolyte secondary battery according to claim 1, wherein the negative electrode plate contains graphite.

4. A nonaqueous electrolyte secondary battery member comprising:
    a positive electrode plate;
    a nonaqueous electrolyte secondary battery separator containing a polyolefin porous film; and
    a negative electrode plate,
    the positive electrode plate, the nonaqueous electrolyte secondary battery separator, and the negative electrode plate being arranged in this order, wherein the polyolefin porous film contains a polyethylene having a weight-average molecular weight of $5 \times 10^5$ to $15 \times 10^6$ in an amount of not less than 68% by weight relative to the total weight of the polyolefin porous film, wherein the polyolefin porous film has a puncture strength of equal to or greater than 26.0 gf/g/m², which puncture strength is measured with respect to a weight per unit area of the polyolefin porous film, and wherein the polyolefin porous film has a value in a range of 0.00 to 0.54, the positive electrode plate has a value in a range of 0.00 to 0.50, and the negative electrode plate has a value in a range of 0.00 to 0.50, where each of the values is represented by the following Formula (1):

$$|1-T/M| \tag{1}$$

where T represents a distance by which the polyolefin porous film, the positive electrode plate, or the negative electrode plate moves in a traverse direction from a starting point of measurement to a point where a critical load is obtained in a scratch test under a constant load of 0.1 N, and M represents a distance by which the polyolefin porous film, the positive electrode plate, or the negative electrode plate moves in a machine direction from a starting point of measurement to a point where a critical load is obtained in a scratch test under a constant load of 0.1 N.

* * * * *